United States Patent
Cao et al.

(10) Patent No.: US 10,942,125 B2
(45) Date of Patent: Mar. 9, 2021

(54) BIOSENSOR

(71) Applicant: Shenzhen Genorivision Technology Co., Ltd., Shenzhen (CN)

(72) Inventors: Peiyan Cao, Shenzhen (CN); Rui Ding, Shenzhen (CN); Yurun Liu, Shenzhen (CN)

(73) Assignee: Shenzhen Genorivision Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/857,634

(22) Filed: Apr. 24, 2020

(65) Prior Publication Data

US 2020/0249171 A1 Aug. 6, 2020

Related U.S. Application Data

(63) Continuation of application No. PCT/CN2017/107779, filed on Oct. 26, 2017.

(51) Int. Cl.
*G01N 21/77* (2006.01)
*G01N 21/64* (2006.01)
*F21V 8/00* (2006.01)
*G01N 21/76* (2006.01)

(52) U.S. Cl.
CPC ..... *G01N 21/7703* (2013.01); *G01N 21/6454* (2013.01); *G01N 21/76* (2013.01)

(58) Field of Classification Search
None
See application file for complete search history.

(56) References Cited

U.S. PATENT DOCUMENTS

| | | | |
|---|---|---|---|
| 2012/0092650 A1* | 4/2012 | Gunn, III | G01N 21/39 356/73 |
| 2013/0157882 A1* | 6/2013 | Quan | G01N 21/77 506/9 |
| 2014/0056057 A1 | 2/2014 | Ozawa | |

FOREIGN PATENT DOCUMENTS

| | | |
|---|---|---|
| CN | 102460254 A | 5/2012 |
| CN | 103245641 A | 8/2013 |
| CN | 106796176 A | 5/2017 |
| CN | 106959370 A | 7/2017 |
| WO | 2016168996 A1 | 10/2016 |

OTHER PUBLICATIONS

PCT/CN2017/10779 ISA210 dated Jul. 23, 2018.
PCT/CN2017/10779 ISA237 dated Jul. 23, 2018.

* cited by examiner

*Primary Examiner* — Neil N Turk
(74) *Attorney, Agent, or Firm* — IPro, PLLC; Qian Gu

(57) ABSTRACT

Disclosed herein is an apparatus, which comprises an optical waveguide, a first and second waveguide couplers. The optical waveguide may be configured to receive light from an end surface of the optical waveguide. The first waveguide coupler may be coupled, at a first coupling strength, to a first portion of the optical waveguide. The second waveguide coupler may be coupled, at a second coupling strength, to a second portion of the optical waveguide. Attenuation of the light at the first portion is smaller than attenuation of the light at the second portion. The first coupling strength is smaller than the second coupling strength. The first waveguide coupler and the second waveguide coupler each comprises a surface comprising sites configured to attach a probe.

31 Claims, 26 Drawing Sheets

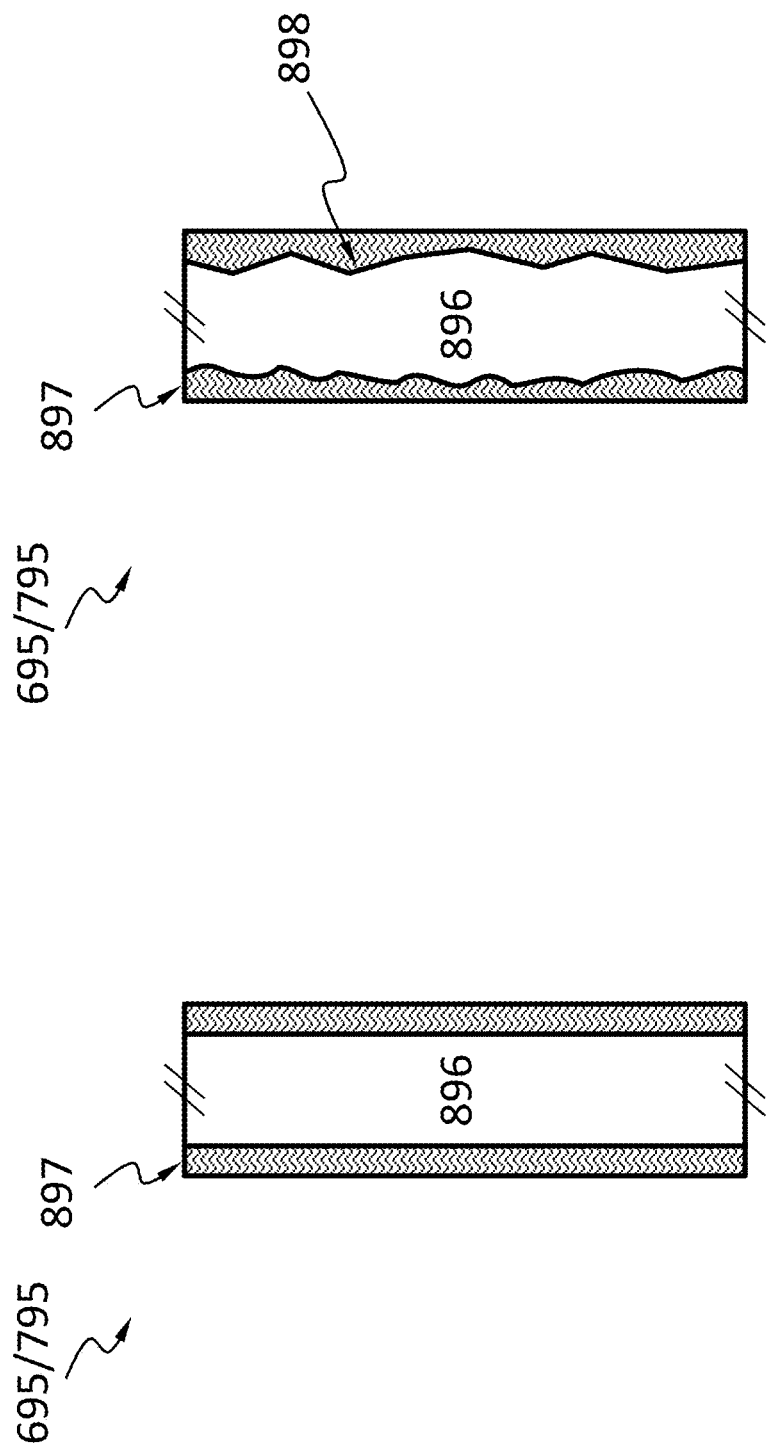

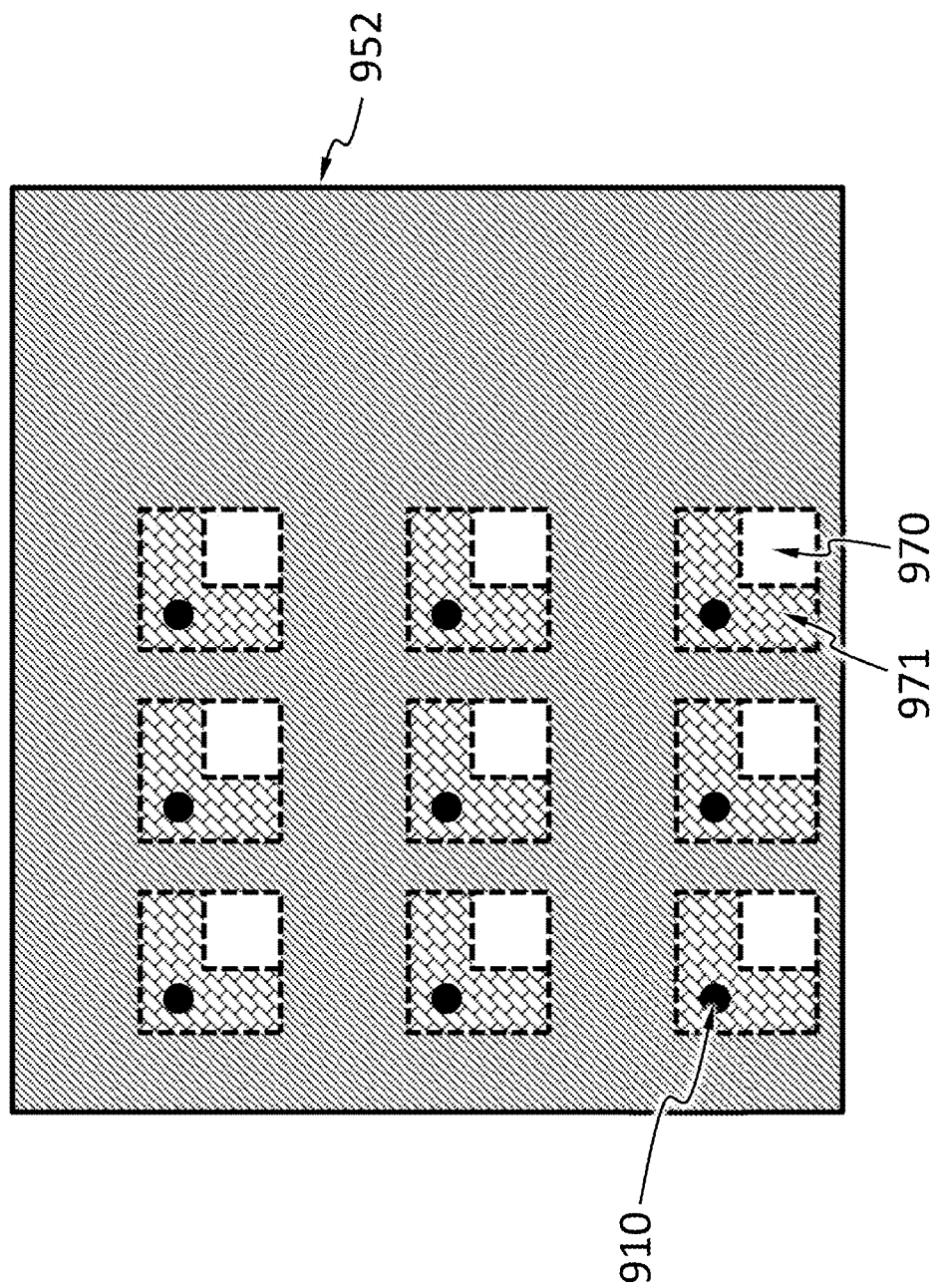

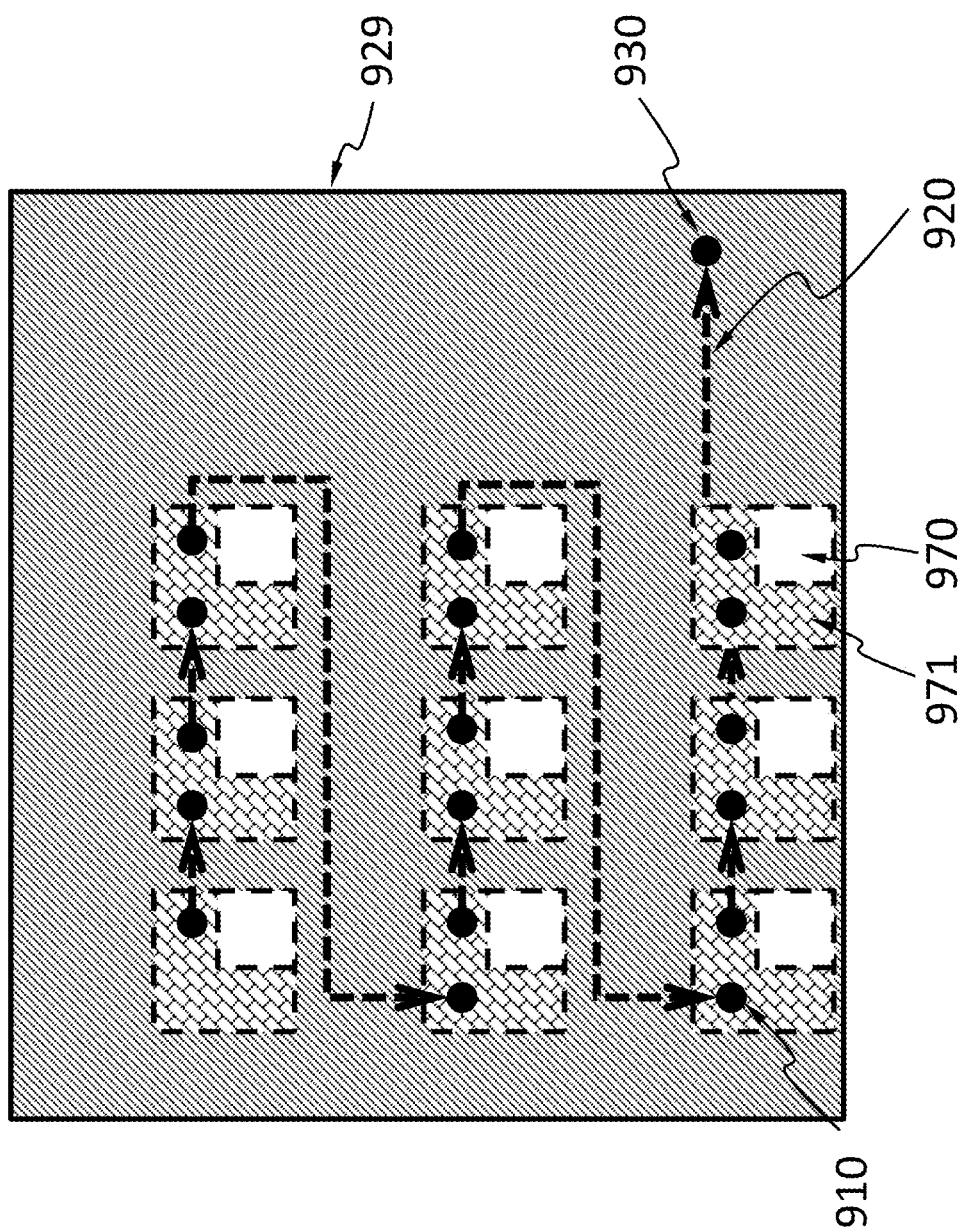

BIOSENSOR

TECHNICAL FIELD

The disclosure herein relates to biosensors, particularly biosensors based on optical detection.

BACKGROUND

A biosensor is an analytical device for detection of an analyte involved in a biological process. For example, the analyte may be a DNA, a protein, a metabolite, or even a living organism (e.g., bacteria, virus).

A biosensor usually has a probe that interacts with the analyte. The probe may be designed to bind or recognize the analyte. Examples of the probe may include antibodies, aptamers, DNAs, RNAs, antigens, etc. Interaction between the probe and the analyte may lead to one or more detectable event. For example, the detectable event may be release of a chemical species or a particle (e.g., a quantum dot), a chemical reaction, luminescence (e.g., chemiluminescence, bioluminescence, electrochemiluminescence, electroluminescence, photoluminescence, fluorescence, and phosphorescence), change in a physical property (e.g., Raman scattering, color) or chemical property (e.g., reactivity, reaction rate).

A biosensor may have a detector that can detect the detectable event as a result of the interaction. The detector may transform the detectable event into another signal (e.g., image, electrical signal) that can be more easily measured and quantified. The detector may include circuitry that obtains data from the detectable event and processes the data.

One type of biosensor is microarrays. A microarray can be a two-dimensional array on a solid substrate (e.g., a glass slide, a silicon wafer). The array may have different assays at different locations. The assays at different locations may be independent controlled or measured, thereby allowing multiplexed and parallel sensing of one or many analytes. A microarray may be useful in miniaturizing diagnosis assays. For example, a microarray may be used for detecting biological samples in the fields without sophisticated equipment, or be used by a patient who is not in a clinic or hospital to monitor his or her physiological symptoms.

SUMMARY

Disclosed herein is an apparatus comprising: an optical waveguide configured to receive light from an end surface of the optical waveguide; a first waveguide coupler coupled, at a first coupling strength, to a first portion of the optical waveguide; a second waveguide coupler coupled, at a second coupling strength, to a second portion of the optical waveguide; wherein attenuation of the light at the first portion is smaller than attenuation of the light at the second portion; wherein the first coupling strength is smaller than the second coupling strength; wherein the first waveguide coupler and the second waveguide coupler each comprises a surface comprising sites configured to attach a probe.

According to an embodiment, a refractive index of the optical waveguide is greater than a refractive index of water.

According to an embodiment, refractive indices of the first waveguide coupler and the second waveguide coupler are greater than a refractive index of water.

According to an embodiment, cross-sectional shape of the optical waveguide is a rectangle, a square, a triangle, or a semi-circle.

According to an embodiment, cross-sectional shape of the first waveguide coupler and the second waveguide coupler is a rectangle, a square, a triangle, or a semi-circle.

According to an embodiment, the first waveguide coupler and the second waveguide coupler extend parallel to the first portion and the second portion, respectively.

According to an embodiment, space between the optical waveguide and the first waveguide coupler and the second waveguide coupler is filled with a material.

According to an embodiment, the optical waveguide, the first waveguide coupler and the second waveguide coupler each comprise a material selected from a group consisting of: glass, quartz, diamond, an organic polymer, and a composite thereof.

According to an embodiment, the sites are configured to directly attach to the probe through physical adsorption, chemical crosslinking, electrostatic adsorption, hydrophilic interaction or hydrophobic interaction.

According to an embodiment, the probe is selected from a group consisting of fluorescently proteins, peptides, oligonucleotides, cells, bacteria, and nucleic acids.

According to an embodiment, the probe comprises an internal luminophore.

According to an embodiment, the first waveguide coupler is farther from the optical waveguide than the second waveguide coupler is.

According to an embodiment, the first portion is shorter than the second portion.

According to an embodiment, the apparatus comprises an optical system, the optical system comprising a plurality of collimators; wherein the collimators are configured to essentially prevent light from passing if a deviation of a propagation direction of the light from an optical axis of the collimators is greater than a threshold.

According to an embodiment, the apparatus comprises a sensor, which comprises a plurality of pixels configured to detect a signal generated by the apparatus.

According to an embodiment, the sensor comprises a control circuit configured to control, acquire data from, or process data from the pixels.

According to an embodiment, the pixels are arranged such that at least one of the pixels is optically coupled to each of the sites.

According to an embodiment, the pixels are optically coupled to the sites by the collimators.

According to an embodiment, the signal is luminescence.

According to an embodiment, the signal is generated under excitation of light coupled from the optical waveguide to the first waveguide coupler or the second waveguide coupler.

According to an embodiment, wherein the optical system further comprises a plurality of microlens.

According to an embodiment, the collimators are configured to eliminate optical cross-talk between neighboring pixels among the plurality of pixels.

According to an embodiment, at least one of the collimators comprises a core and a sidewall surrounding the core.

According to an embodiment, the core is a material that essentially prevents the light from passing through irrespective of propagation direction of the light.

According to an embodiment, the core allows a signal generated by the apparatus to pass through essentially unabsorbed.

According to an embodiment, the core is a void space.

According to an embodiment, the sidewall attenuates a portion of a signal generated by the apparatus reaching the sidewall.

According to an embodiment, the sidewall is textured.

According to an embodiment, the pixels are arranged in an array and are configured to be read out column by column.

According to an embodiment, the pixels are arranged in an array and are configured to be read out pixel by pixel.

Disclosed herein is a total internal reflection fluorescence microscope (TIRFM) comprising any of the above apparatuses.

BRIEF DESCRIPTION OF FIGURES

FIG. 8A schematically shows a collimator, according to an embodiment.

FIG. 8B schematically shows a collimator, according to an embodiment.

FIG. 9B schematically shows a top view of the sensor in FIG. 9A.

FIG. 10F schematically shows a top view of the sensor in FIG. 10A, according to an embodiment.

DETAILED DESCRIPTION

Figure 1A:
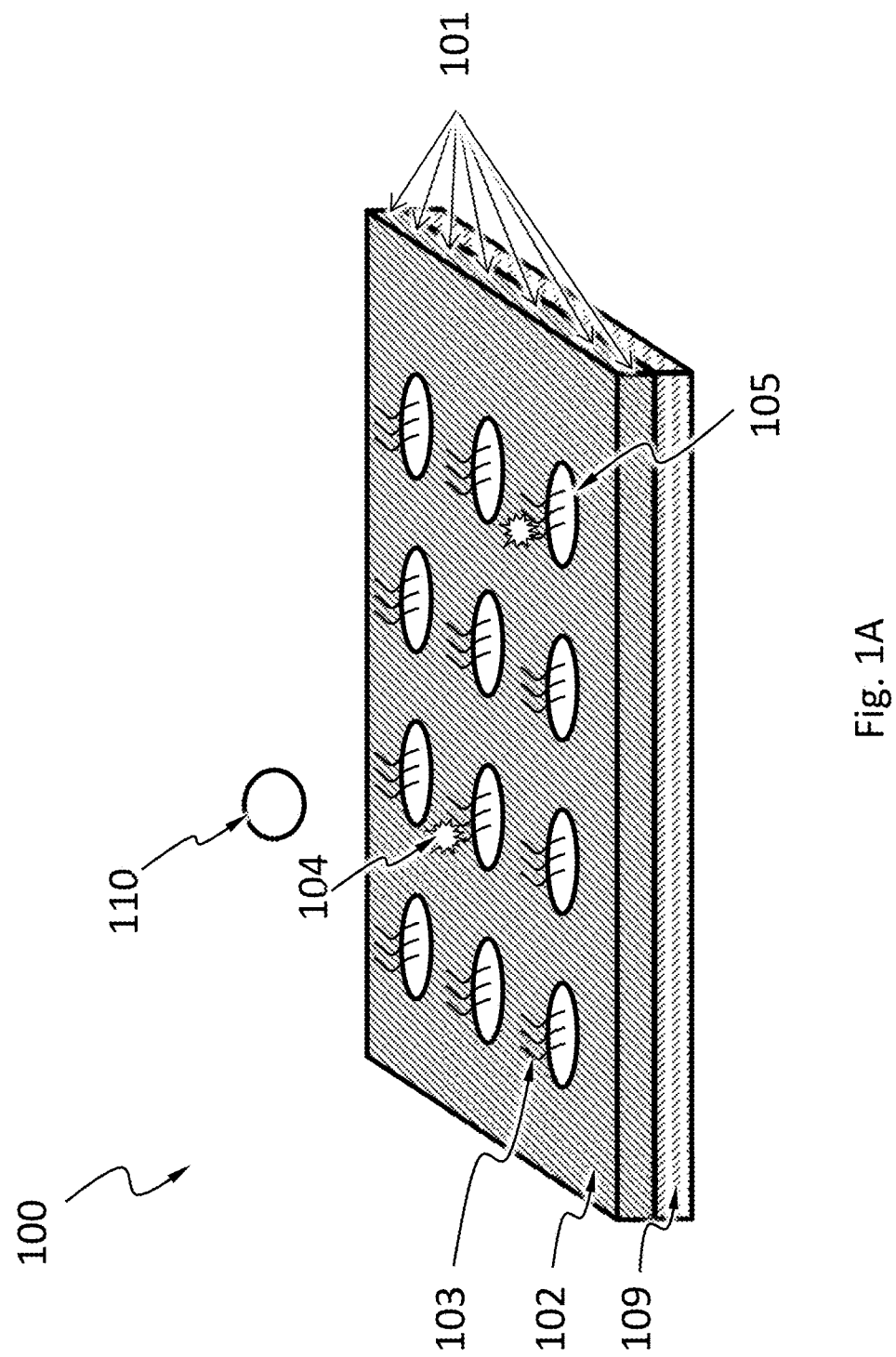
FIG. 1A schematically shows a probe carrier of a biosensor.

FIG. 1A illustrates a probe carrier 100 of a biosensor. The probe carrier 100 comprises a sheet of optical waveguide 102. A laser 101 is coupled to the sheet of optical waveguide 102 from its edge. To facilitate the coupling, the laser 101 is spread from a beam to a sheet. A sheet of laser may be produced by spreading a laser beam in only one direction. The sheet of laser is directed to an edge of the sheet of optical waveguide 102 to couple the laser into the sheet of optical waveguide 102. A plurality of probes 103 are attached to sites 105 at a surface of the sheet of optical waveguide 102. The probes 103 may interact with analytes 110 in a sample in contact with the probes 103, and the interaction may generate a signal 104 under the excitation of the laser propagating in the sheet of optical waveguide 102. The sheet of optical waveguide 102 may be placed on a substrate 109. The combination of the sheet of optical waveguide 102 and the substrate 109 may be called a probe carrier.

Figure 1B:
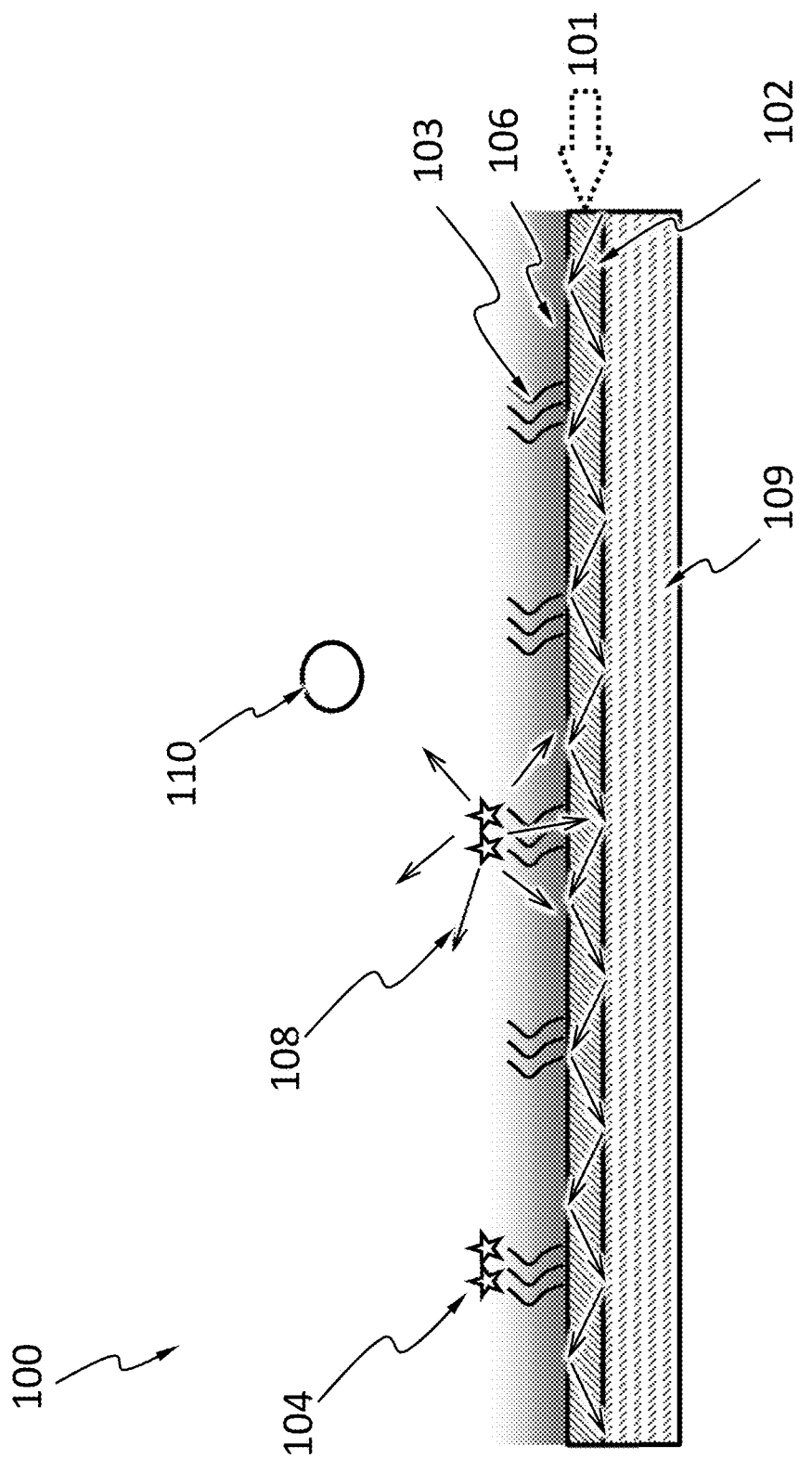
FIG. 1B schematically shows a cross-sectional view of the probe carrier in FIG. 1A.

FIG. 1B shows a cross-sectional view of the probe carrier 100 in FIG. 1A. The laser 101 coupled into the sheet of optical waveguide 102 undergoes total internal reflection at least at the surface to which the probes 103 are attached. The evanescent wave 106 outside this surface of the sheet of optical waveguide 102 can excite the probes 103 interacting with the analytes 110, thereby generating the signal 104. As used herein, total internal reflection refers to a phenomenon which occurs when a propagating wave strikes a medium boundary at an angle larger than a particular critical angle with respect to the normal to the surface. If the refractive index is lower on the other side of the boundary and the incident angle is greater than the critical angle, the wave cannot pass through and is entirely reflected. The critical angle is the angle of incidence above which the total internal reflection occurs. There are two necessary conditions for total internal reflection: incident light wave travels from an optically dense medium to an optically less dense media, and the incident angle must be greater than or equal to a critical angle. An important effect of total internal reflection is the appearance of an evanescent wave beyond the boundary surface. Essentially, even though the entire incident wave is reflected back into the originating medium, the evanescent wave penetrates into the second medium at the boundary. The evanescent wave appears to travel along the boundary between the two materials and then returns into the optically dense medium. The evanescent wave is characterized by its propagation in a parallel direction of the interface and its exponential attenuation in a direction perpendicular to the interface. The 1/e-penetration distance in the direction perpendicular to the interface can be several hundred nanometers. As shown in FIG. 1B, the probes 103 located within the reach of the evanescent wave 106 (as shown by the grey color in gradient) may be excited by the evanescent wave 106 and generate a signal 104. The signal may transmit in a variety of directions 108. The intensity of the signal 104 is proportional to the amount of analytes 110. By detecting the intensity of the signal 104, the amount of the analytes 110 in a biological sample of interest can be calculated.

Figure 2A:
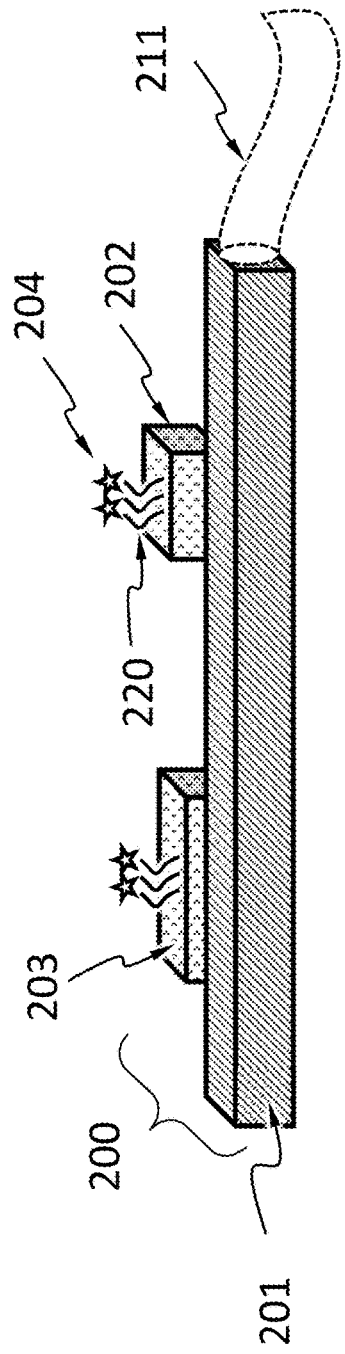
FIG. 2A schematically illustrates a perspective view of an apparatus suitable for detecting analytes, according to an embodiment.
Figure 2B:
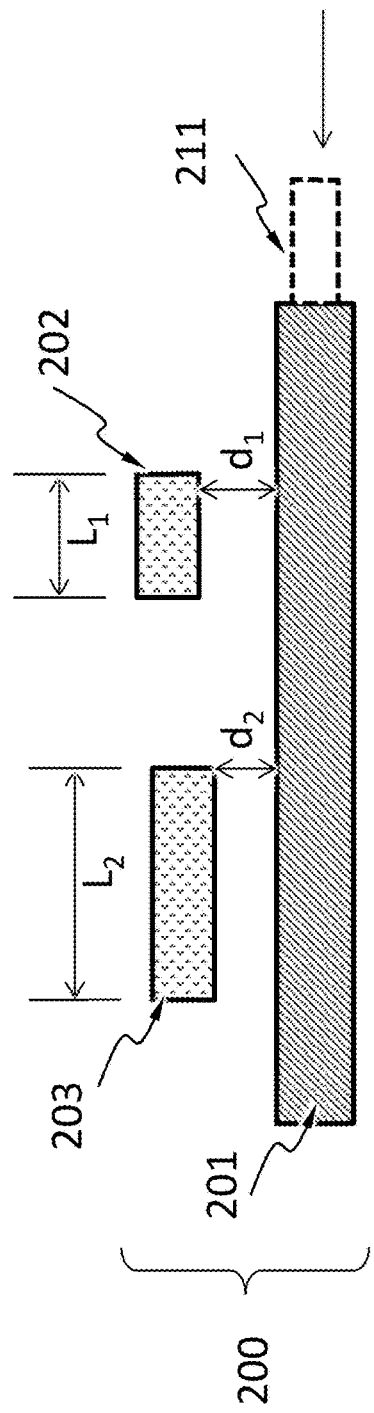
FIG. 2B schematically illustrates a top view of the apparatus in FIG. 2A, according to an embodiment.

FIG. 2A and FIG. 2B schematically illustrate a perspective view and a top view of an apparatus 200 suitable for detecting analytes 204 respectively, according to an embodiment. The apparatus 200 may comprise an optical waveguide 201, a first waveguide coupler 202 and a second waveguide coupler 203. The first waveguide coupler 202 is coupled to a first portion of the optical waveguide 201. The second waveguide coupler 203 is coupled to a second portion of the optical waveguide 201. In an embodiment, the first and second waveguide couplers 202 and 203 are configured to only receive light through coupling to the optical waveguide 201.

The optical waveguide 201 may be in a shape of a band or a strip. The optical waveguide 201 may be straight or curved. The optical waveguide 201 may have any suitable cross-sectional shape, such as a rectangle, a square, a triangle, a semi-circle or a polygon. The optical waveguide 201 may comprise a material selected from a group consisting of: glass, quartz, diamond, an organic polymer, and a composite thereof. The optical waveguide 201 may have a refractive index greater than a refractive index of water.

Light (e.g., laser) may be coupled into the optical waveguide 201 by an optical fiber 211 connected to the surface of an input end of the optical waveguide 201.

The first and second waveguide couplers 202 and 203 may be optical waveguides. Each of the first and second waveguide couplers 202 and 203 may have any suitable cross-sectional shape, such as a rectangle, a square, a triangle, a semi-circle or a polygon. Each of the first and second waveguide couplers 202 and 203 may comprise a material selected from a group consisting of: glass, quartz, diamond, an organic polymer, and a composite thereof. The refractive indexes of both the first and second waveguide couplers 202 and 203 may be larger than the refractive index of water.

The first and second waveguide couplers 202 and 203 each may comprise a surface with sites configured to attach probes 220. Each of the probes 220 may be elected from a group consisting of fluorescently proteins, peptides, oligonucleotides, cells, bacteria, and nucleic acids. Each of the probes 220 may comprise an internal luminophore. The sites may be configured to attach to the probes 220 through physical adsorption, chemical crosslinking, electrostatic adsorption, hydrophilic interaction or hydrophobic interaction.

When a waveguide coupler (e.g., 202, or 203) is very close to a portion of an optical waveguide (e.g., within a few wavelengths of the light in the optical waveguide 201), a portion of the light in the portion of the optical waveguide can couple into the waveguide coupler through the evanescent wave at the surface of the optical waveguide (i.e., the waveguide coupler coupled to the portion of the optical waveguide). The term "coupling strength" is defined as the ratio of the intensity of the light coupled into the waveguide coupler to the intensity of the light in the portion of the optical waveguide.

As shown in FIG. 2B, the first waveguide coupler 202 and the first portion of the optical waveguide 201 may coextend (e.g., being parallel to each other) by a length $L_1$, with a distance $d_1$ between the first waveguide coupler 202 and the first portion. The length $L_1$ equals to the length of the first waveguide coupler 202 in example of FIG. 2B. The first waveguide coupler 202 is coupled to the first portion of the optical waveguide 201 at a first coupling strength. The first coupling strength is a function of the distance $d_1$, the length $L_1$, and the refractive index of the first waveguide coupler 202. The first coupling strength may also be a function of the differences among the refractive indices of the optical waveguide 201, the first waveguide coupler 202, and the medium in-between. The intensity of light coupled into the first waveguide coupler 202 depends on the intensity of light in the first portion of the optical waveguide 201 and the first coupling strength.

Similarly, the second waveguide coupler 203 and the second portion of the optical waveguide 201 may coextend (e.g., being parallel to each other) by a length $L_2$, with a distance $d_2$ between the second waveguide coupler 203 and the second portion. The length $L_2$ equals to the length of the second waveguide coupler 203 in example of FIG. 2B. The second waveguide coupler 203 is coupled to the second portion of the optical waveguide 201 at a second coupling strength. The second coupling strength is a function of the distance $d_2$, the length $L_2$, and the refractive index of the second waveguide coupler 203. The second coupling strength may also be a function of the differences among the refractive indices of the optical waveguide 201, the second waveguide coupler 203, and the medium in-between. The intensity of light coupled into the second waveguide coupler 203 depends on the intensity of light in the second portion of the optical waveguide 201 and the second coupling strength.

In an embodiment, the first and second waveguide couplers 202 and 203 may not necessarily be positioned on the same side of the optical waveguide 201 as in the example of FIG. 2A and FIG. 2B.

Figure 2C:
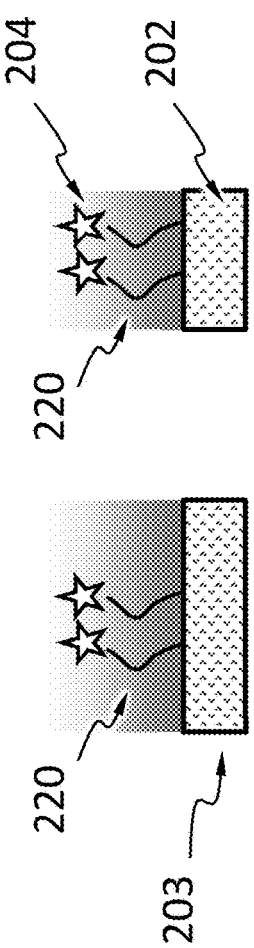
FIG. 2C schematically illustrates a cross-sectional view of the first and second waveguide couplers of the apparatus in FIG. 2A, according to an embodiment.

FIG. 2C schematically illustrates a cross-sectional view of the first and second waveguide couplers 202 and 203 in FIGS. 2A and 2B, according to an embodiment. The light in the first waveguide coupler 202 generates a first evanescent wave (as shown by the grey gradient) at the surface of the first waveguide coupler 202, where the probes 220 attach. The probes 220 of the first waveguide coupler 202 are excited by the first evanescent wave and generate a first signal upon interaction with the analytes 204.

Similarly, the light in the second waveguide coupler 203 generates a second evanescent wave (as shown by the grey gradient) at the surface of the second waveguide coupler 203, where the probes 220 attach. The probes 220 of the second waveguide coupler 203 are excited by the second evanescent wave and generate a second signal upon interaction with the analytes 204.

The intensity of a signal (e.g., the first signal, or the second signal) may depend on the amount of analytes 204 that interact with the probes 220 of a waveguide coupler (e.g., 202, or 203), and the intensity of the evanescent wave of the waveguide coupler. By measuring the intensities of the signals (e.g., the first signal and the second signal), information such as concentration and distribution of the analytes in a biological sample of interest may be calculated. In an embodiment, uniformity of the intensities of the evanescent waves (e.g., the first and second evanescent waves) among the waveguide couplers can simplify the calculation.

The intensity of an evanescent wave (e.g., the first or the second evanescent wave) of a waveguide coupler (e.g., 202 or 203) is a function of the intensity of light coupled into the waveguide coupler. Hence, the intensity of the first evanescent wave is a function of the first coupling strength and the intensity of light in the first portion of the optical waveguide 201; the intensity of the second evanescent wave is a function of the second coupling strength and the intensity of the light in the second portion of the optical waveguide 201.

When light travels within the optical waveguide 201 from the input end, the light may lose intensity along the way. This phenomenon is known as attenuation (also known as transmission loss). Attenuation may be a function of distance traveled by the light through optical waveguide 201. Attenuation at a location that is away from the input end of the optical waveguide 201 by a distance L can be expressed as $$\text{Attenuation}(L) = 10 \times \log_{10}\left(\frac{\text{Intensity}(0)}{\text{Intensity}(L)}\right),$$

where Intensity (L) is the intensity of the light at that location and Intensity (0) is the intensity at the input end. The attenuation may be caused by various mechanisms: such as absorption loss relates to the impurities in the optical waveguide, bending loss induced by physical stress on the optical waveguide, etc. If the attenuation is not uniform along the optical waveguide 201, the intensity of light in the first portion is larger than the intensity of light in the second portion, if the first portion is closer to the input end than the second portion. The coupling strength may be used to compensate for the different attenuation at the first and second portions. For example, the first coupling strength may be made smaller than the second coupling strength if the first portion is closer to the input end than the second portion. Adjustment of the first coupling strength and the second coupling strength can be achieved by adjusting the lengths $L_1$ and $L_2$, refractive indices, or distances $d_1$ and $d_2$. For example, the first coupling strength may be made smaller than the second coupling strength by making the length $L_1$ shorter than the length $L_2$ or by making the distance $d_1$ larger than the distance $d_2$, as shown in FIG. 2A, FIG. 2B and FIG. 2C.

Figure 3A:
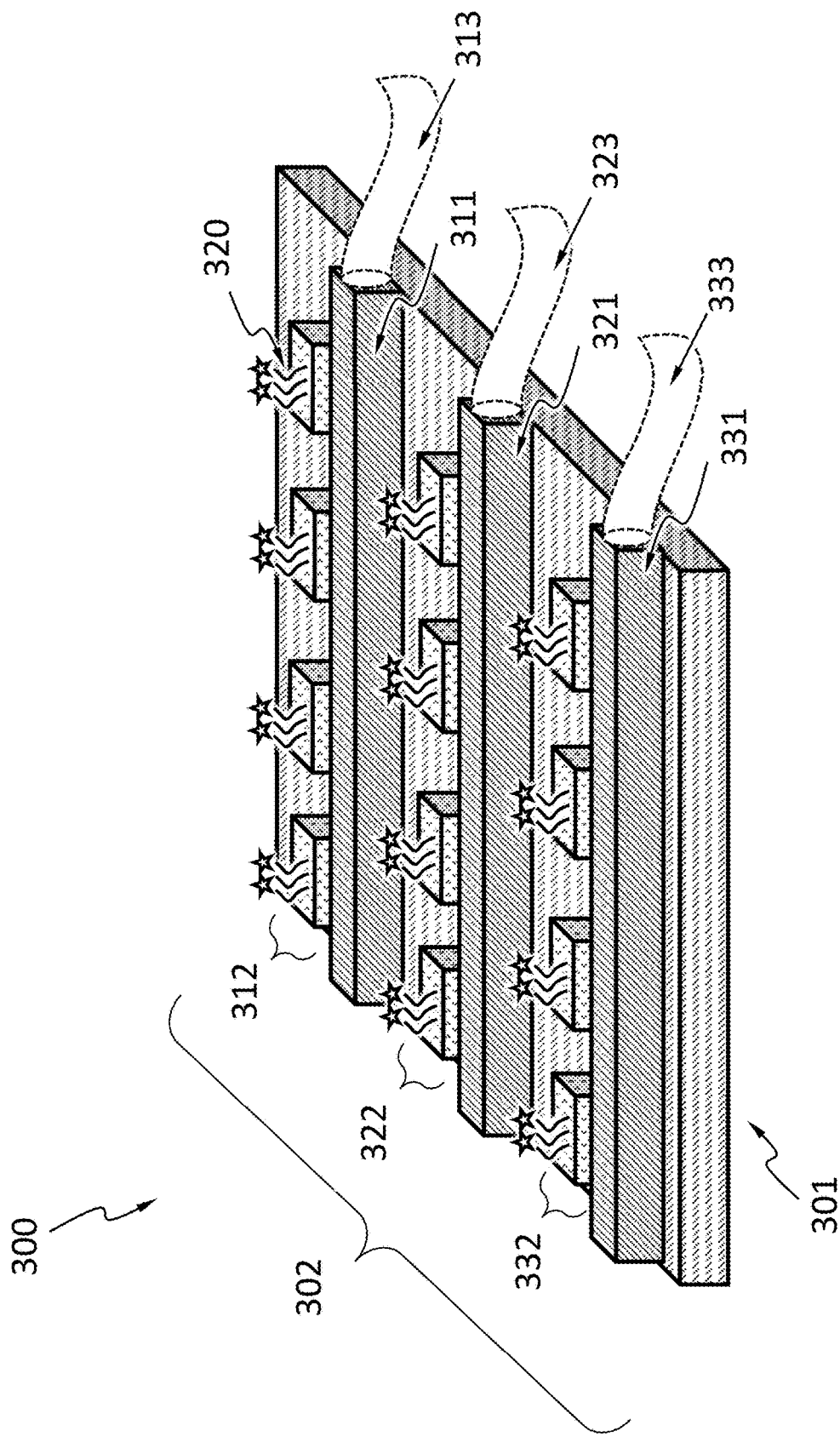
FIG. 3A schematically illustrates a prospective view of a probe carrier of a biosensor, according to an embodiment.

FIG. 3A schematically illustrates a prospective view of a probe carrier 300 of a biosensor, according to an embodiment. The probe carrier 300 may have a plurality of the apparatuses 200. The probe carrier 300 comprises an optical waveguide layer 302 on a substrate 301. The optical waveguide layer 302 comprises a plurality of optical waveguides (e.g., 311, 321 and 331) respectively coupled to a plurality of groups (e.g., 312, 322 and 332) of waveguide couplers. Each of the waveguide couplers may comprise a surface with sites configured to attach probes 320. Light (e.g., laser) may be coupled into the optical waveguides by optical fibers (e.g., 313, 323 and 333) connected to input ends of the optical waveguides respectively. The substrate 301 may be planar or nonplanar.

The optical waveguides may be arranged in any formation such as an array with a periodicity or an ensemble without a periodicity. The optical waveguides may be parallel to one another, or nonparallel to one another. Each of optical waveguides may be optically decoupled from another of the optical waveguides.

In an embodiment, any two of the waveguide couplers coupled to different optical waveguides are optically decoupled from each other. For example, any waveguide coupler in the group 312 is optically decoupled from any waveguide coupler in the group 321 or 331. In an embodiment, any two of the waveguide couplers coupled to the same optical waveguide are optically decoupled from each other.

Cross-talks between probes on the waveguide couplers coupled to different optical waveguides may be reduced or eliminated by selectively turning these optical waveguides on or off. For example, if two probes are attached to two waveguide couplers coupled with two different optical waveguides (e.g., 311 and 321) of the optical waveguide layer 302, the light coupled into one (e.g., 311) of the two different optical waveguides may be turned off while the light coupled into the other (e.g., 312) of the two different optical waveguides remains on. Therefore, the probe attached to the one waveguide coupler coupled to the one optical waveguide (e.g., 311) with the light coupled thereto turned off cannot generate the observed signal and the observed signal from the two probes must be generated by the probe attached to the other waveguide coupler coupled to the other optical waveguide (e.g., 312) with the light coupled thereto turned on.

Cross-talks between probes on the waveguide couplers coupled with the same optical waveguide may also be reduced or eliminated by the arrangement of the waveguide couplers.

Figure 3B:
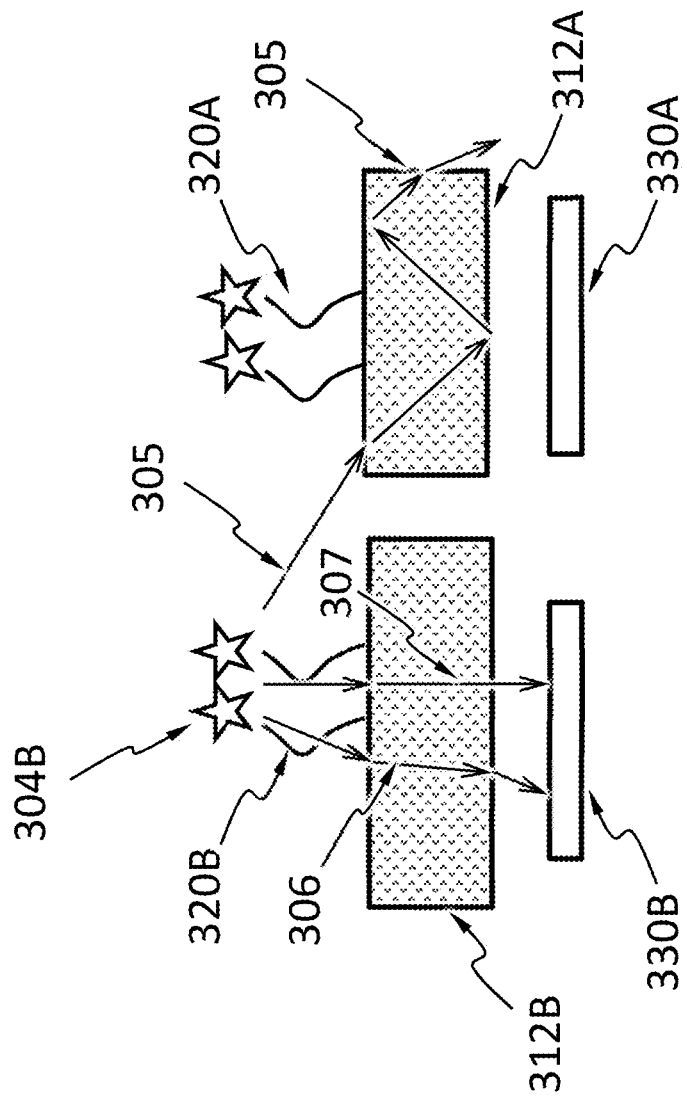
FIG. 3B schematically illustrates a cross-sectional view of a probe carrier, according to an embodiment.

FIG. 3B schematically illustrates a cross-sectional view of two of the waveguide couplers 312A and 312B coupled to the same optical waveguide 311, according to an embodiment. Two probes 320A and 320B are attached to the waveguide couplers 312A and 312B respectively. There are two detectors 330A and 330B positioned directly below the probes 320A and 320B, respectively. The detectors 330A and 330B are configured to respectively detect signals the probes 320A and 320B generate from interaction with an analyte. However, a portion 305 of the signal 304B generated by the probe 320B may propagate toward the detector 330A. If the portion 305 reaches the detector 330A, crosstalk occurs and the signal detected by the detector 330A will be interpreted as being from the probe 320A, thereby causing an error. The waveguide coupler 312A may trap by total internal reflection the portion 305 due to the relatively large angle of incidence of the portion 305, and redirect the portion 305 out of the detection area of the detector 330A when the portion 305 leaves the waveguide coupler 312A, thereby preventing crosstalk with the neighboring probe 320A. Other portions (e.g., 306 and 307) of the signal 304B that have relatively small angles of incidence may travel through the waveguide coupler 312B and be collected by the detector 330B.

Figure 4:
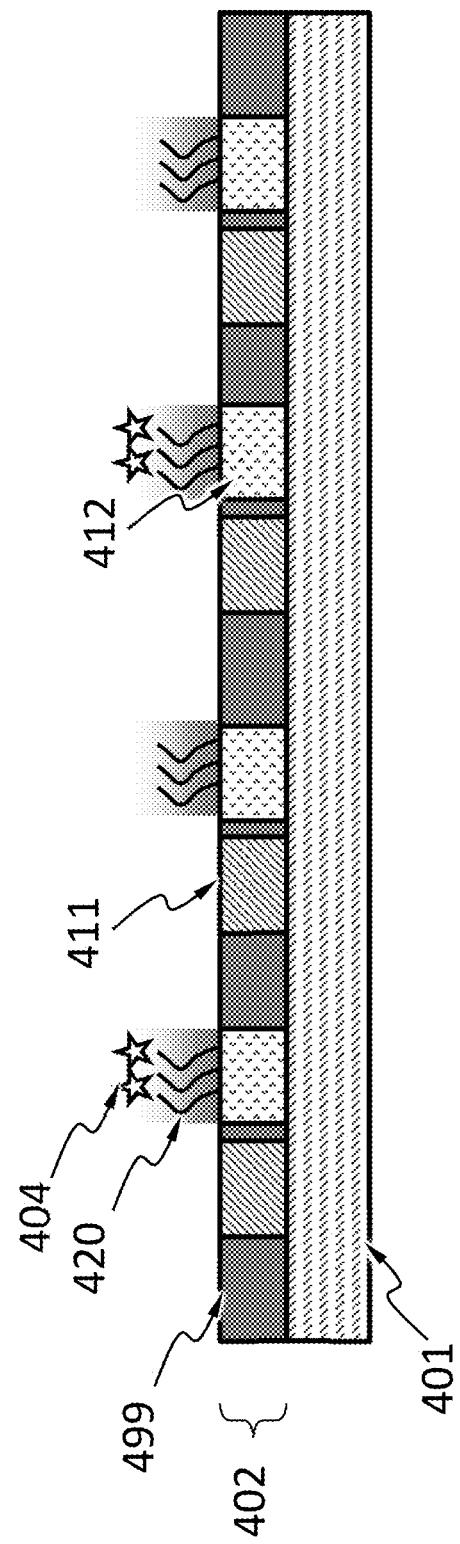
FIG. 4 schematically illustrates a cross-sectional view of a probe carrier with a filling material, according to an embodiment.

FIG. 4 schematically illustrates a cross-sectional view of a plurality of optical waveguides in a waveguide layer 402 of a probe carrier, the waveguide layer 402 being on a substrate 401, according to an embodiment. The space between the plurality of optical waveguide 411 and the plurality of waveguide couplers 412 may be filled with a material 499 that is opaque to the signal 404 coming from interaction of probes 420 attached to the waveguide couplers 412 with an analyte. The materials 499 may have a smaller refractive index than the refractive indexes of the optical waveguides 411 and the waveguide couplers 412.

Figure 5:
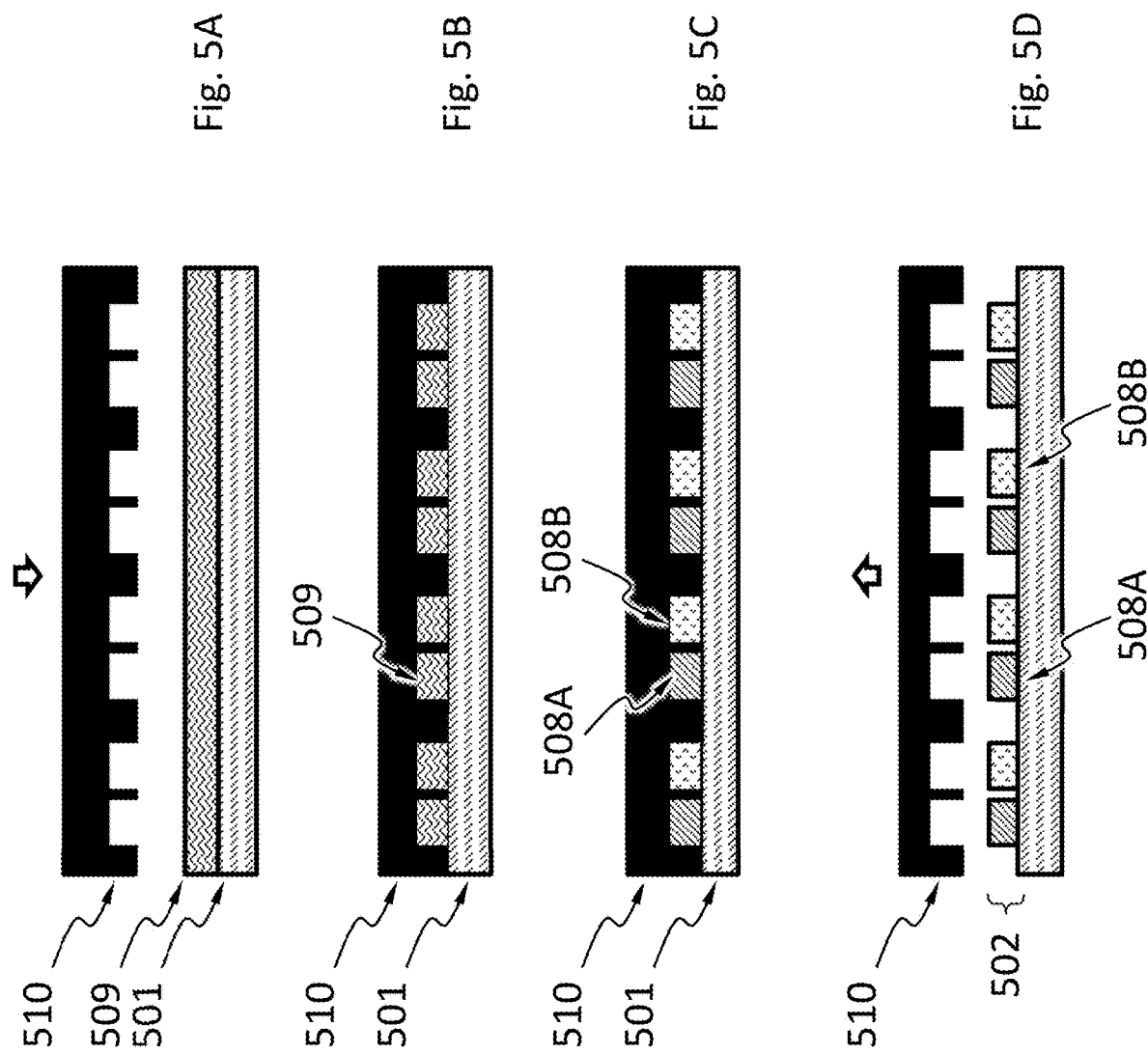
FIG. 5A-FIG. 5D schematically illustrate a method of making a waveguide layer with a plurality of optical waveguides and a plurality of waveguide couplers on a substrate, according to an embodiment.

FIG. 5A-FIG. 5D schematically illustrate a method of making a waveguide layer with a plurality of optical waveguides and a plurality of waveguide couplers on a substrate, according to an embodiment. FIG. 5A shows that a mold 510 is pressed into a layer of precursor 509 on a substrate 501. FIG. 5B shows that precursor 509 flows into recesses in the mold 510. FIG. 5C shows that the precursor 509 is cured to form the plurality of optical waveguides 508A and the plurality of waveguide couplers 508B while the mold 510 is still pressed against the substrate 501. FIG. 5D shows that the mold 510 is released from the substrate 501, leaving behind the plurality of optical waveguides 508A and the plurality of waveguide couplers 508B arranged in a waveguide layer 502.

Figure 6:
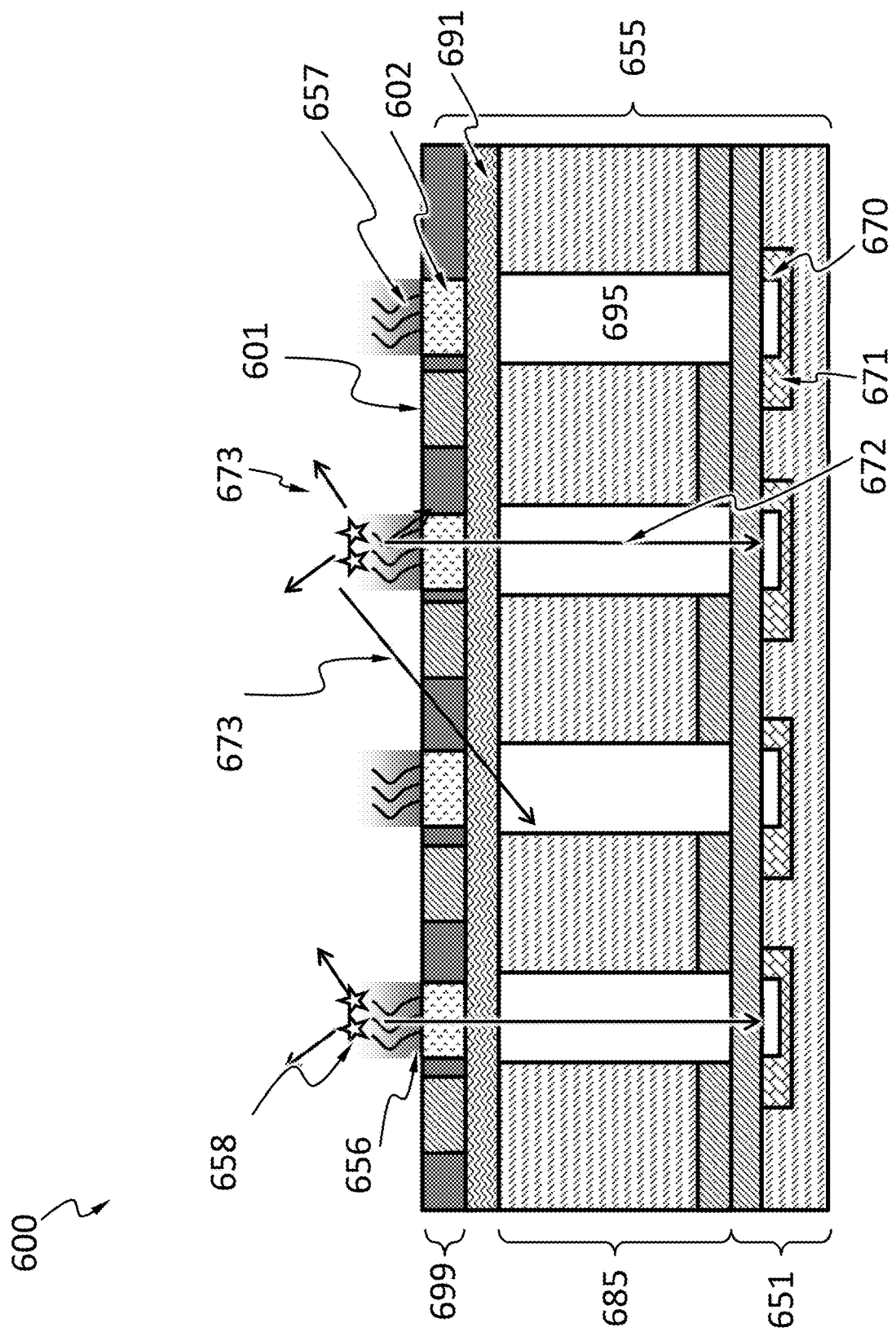
FIG. 6 schematically shows an apparatus comprising a probe carrier such as the probe carrier as shown in FIG. 3A, according to an embodiment.

FIG. 6 schematically shows an apparatus 600 comprising a probe carrier, such as the probe carrier 300 as shown in FIG. 3A, according to an embodiment. The apparatus 600 comprises a microarray 655 comprising a plurality of optical waveguides 601 arranged in a waveguide layer 699 on a substrate 691, a plurality of groups of waveguide couplers 602 coupled with the optical waveguides 601, an integrated sensor 651 and an optical system 685. The microarray 655 may have multiple sites 656 on the waveguide couplers 602 with various probes 657 attached thereto. The probes 657 may interact with various analytes and the interaction may generate signals 658 detectable by the sensor 651. The sensor 651 may have multiple pixels 670 configured to detect the signals 658 (e.g., color, intensity). The pixels 670 may have a control circuit 671 configured to control, acquire data from, and/or process data from the pixels 670. The pixels 670 may be arranged such that each pixel 670 is optically coupled to one or more of the sites 656. The substrate 691 is transparent to the signals 658. The optical system 685 may include a plurality of collimators 695 configured to optically couple the pixels 670 to the sites 656. In an embodiment, the sensor 651 comprises quantum dots.

In an embodiment, the substrate 691 may include oxide or nitride. For example, the substrate 691 may include glass. In an embodiment, the substrate 691 may even be omitted.

In other embodiments, other types of microarrays may be used with any of the aforementioned probe carriers to form a biosensor apparatus. Some examples of such microarrays are illustrated as below.

Figure 7A:
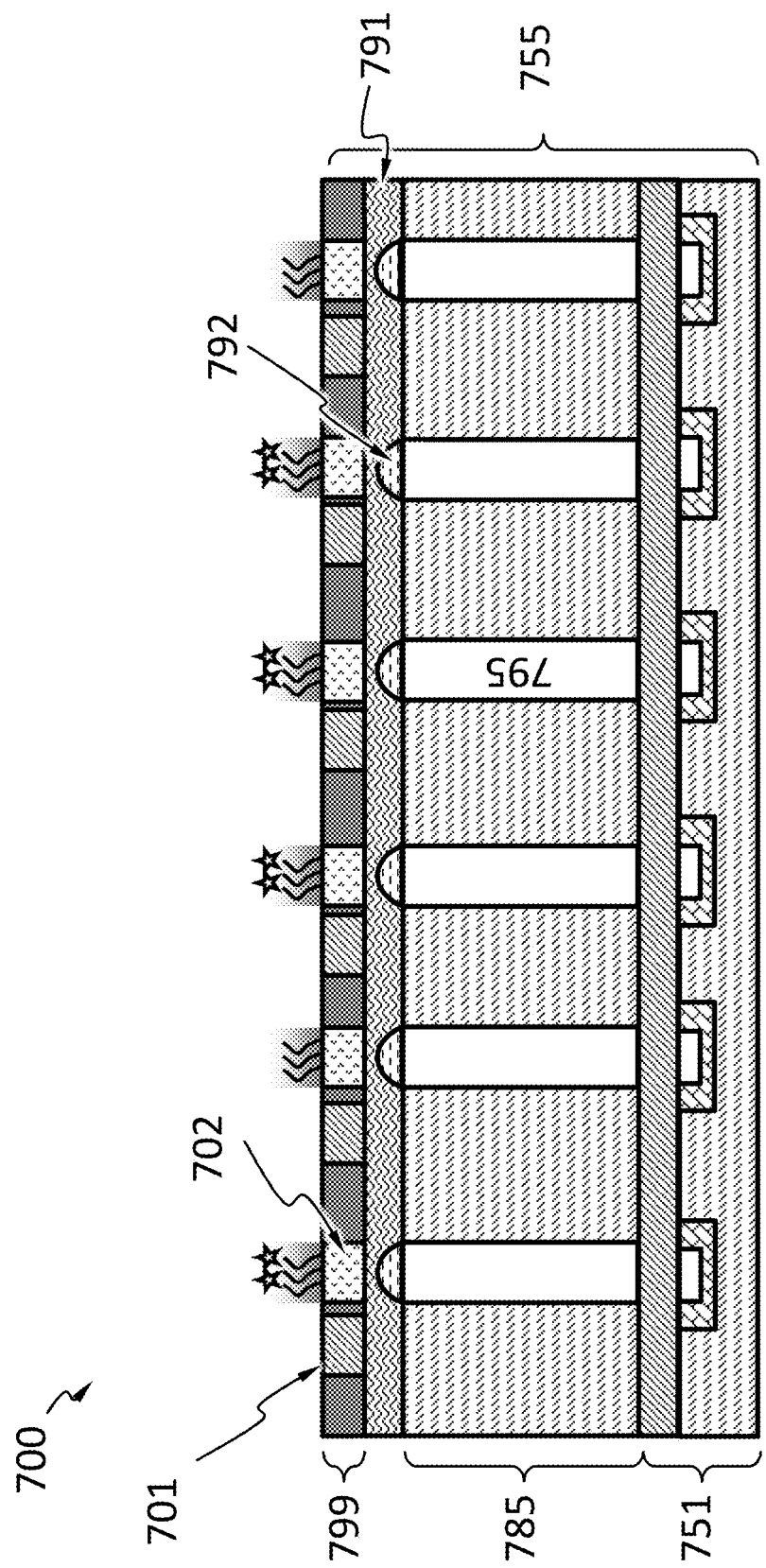
FIGS. 7A and 7B schematically shows an apparatus comprising a probe carrier such as the probe carrier as shown in FIG. 3A, according to an embodiment.
Figure 7B:
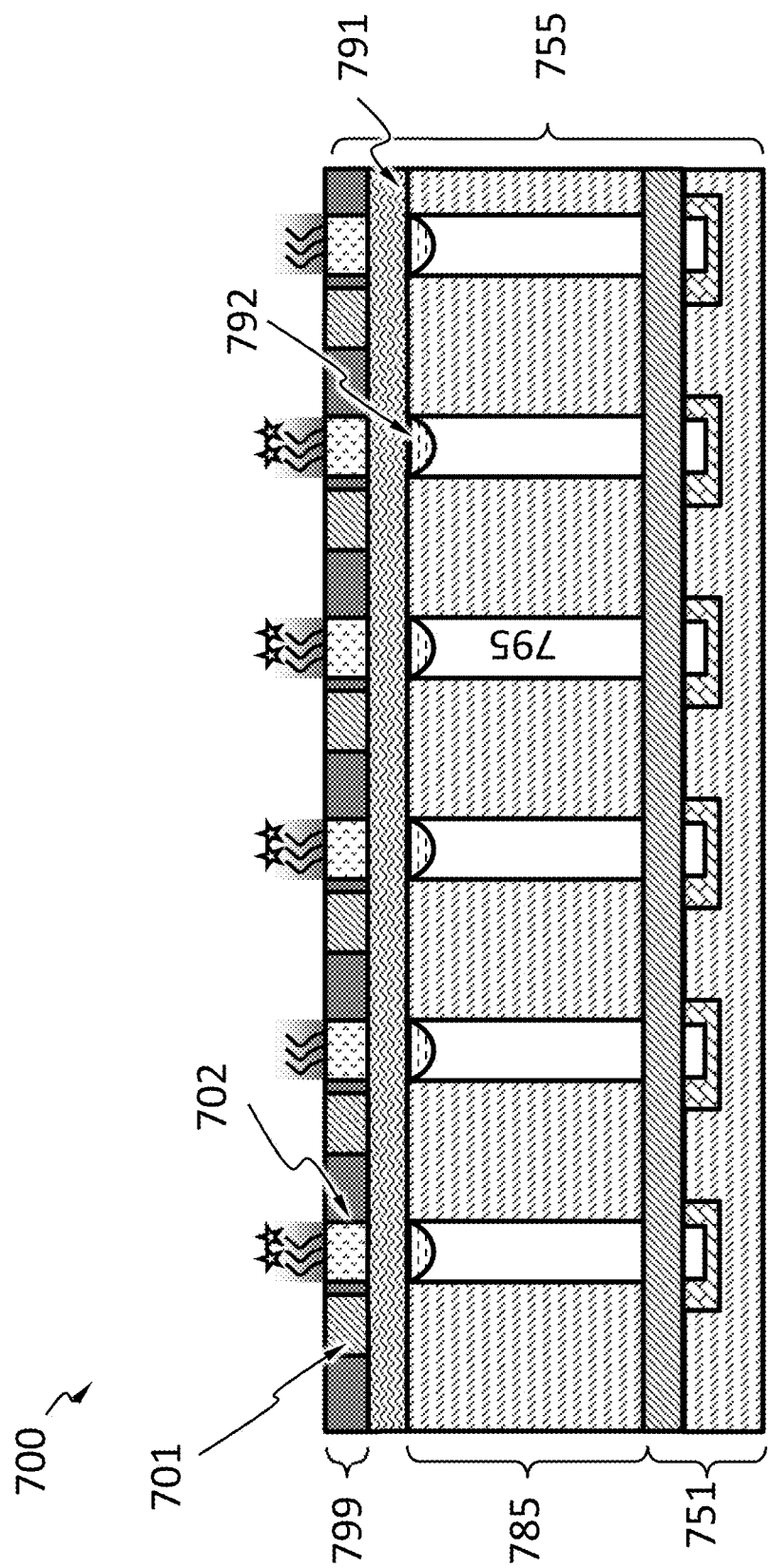

FIGS. 7A and 7B schematically shows an apparatus 700 comprising a probe carrier, such as the probe carrier 300 as shown in FIG. 3A, according to an embodiment. As shown in FIG. 7A and FIG. 7B, the apparatus 700 comprises a microarray 755 comprising a plurality of optical waveguides 701 arranged in a waveguide layer 799 on a substrate 791, a plurality of waveguide couplers 702 coupled with the optical waveguides 701, an integrated sensor 751 and an optical system 785, and the optical system 785 may have a plurality of microlens 792. The microlens 792 may be fabricated in the substrate 791 as shown in FIG. 7A. Alternatively, the microlens 792 may be fabricated in the collimators 795 as shown in FIG. 7B. The microlens 792 may be configured to focus light generated by the probes into the collimators 795. The microlens 792 may be configured to direct a greater portion of luminescence signal from probes into the pixels coupled thereto.

In embodiments as shown in FIG. 6, FIG. 7A and FIG. 7B, each site is aligned with one of the collimators. This is achieved by controlled fabrication process such that the holes in the probe carrier has a same width as the width of the collimators in the microarray, and appropriate alignment of the probe carrier with the microarray is required during assembly of the probe carrier with the microarray to form the biosensor apparatus.

In an embodiment, the optical waveguides 601 or 701, the waveguide couplers 602 or 702, the substrate 691 or 791, the microlens 792 if present and the collimator 695 or 795 may be integrated on the same substrate.

In an embodiment, the collimator 695 or 795 may be configured to essentially prevent (e.g., prevent more than 90%, 99%, or 99.9% of) light from passing if the deviation of the propagation direction of the light from an optical axis of the collimator 695 or 795 is greater than a threshold (e.g., 20°, 10°, 5°, or 1°). Such as shown in FIG. 6, a portion 672 of the signals 658 may propagate toward the pixel 670 optically coupled to that site 656 but another portion 673 may be scattered towards neighboring pixels ("optical crosstalk") and/or away from all pixels 670. The collimator 695 may be configured to essentially eliminate optical cross-talk by essentially preventing the portion 673 from passing through the collimator 695.

In an embodiment, each of the collimators 695 or 795 extends from one of the sites 656 to the pixel 670 optically coupled to that one location.

In an embodiment, schematically shown in FIG. 8A, the collimator 695 or 795 may have a core 896 surrounded by a sidewall 897. The sidewall 897 of the collimator 695 or 795 may attenuate (absorb) the portion 673. In the embodiment in FIG. 6, the portion 673 of the signal 658 may enter the collimator 695 but is likely to reach the sidewall 897 before it can reach the pixels 670. The sidewall 897 that can attenuate (absorb) the portion 673 will essentially prevent portion 673 from reaching the pixels 670. In an embodiment, the core 896 may be a void space. Namely, the sidewall 897 surrounds a void space.

In an embodiment, schematically shown in FIG. 8B, the sidewall 897 is textured. For example, the interface 898 between the sidewall 897 and the core 896 (which can be a void space) may be textured. Textured sidewall 897 can help further attenuate light incident thereon.

Figure 8C:
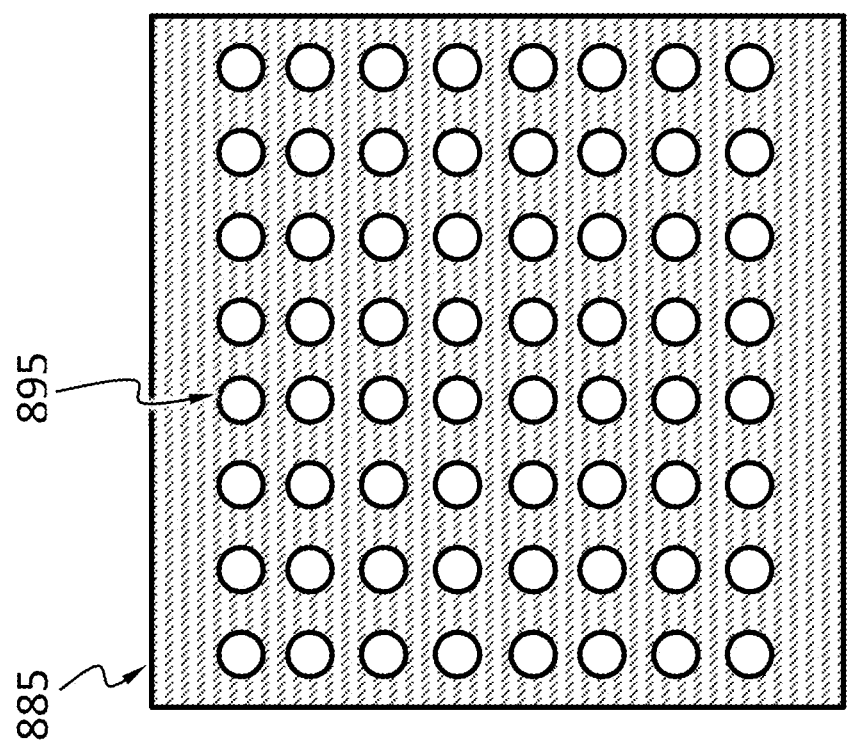
FIG. 8C and FIG. 8D each schematically show that the optical system may have a plurality of collimators arranged in an array, according to an embodiment.
Figure 8D:
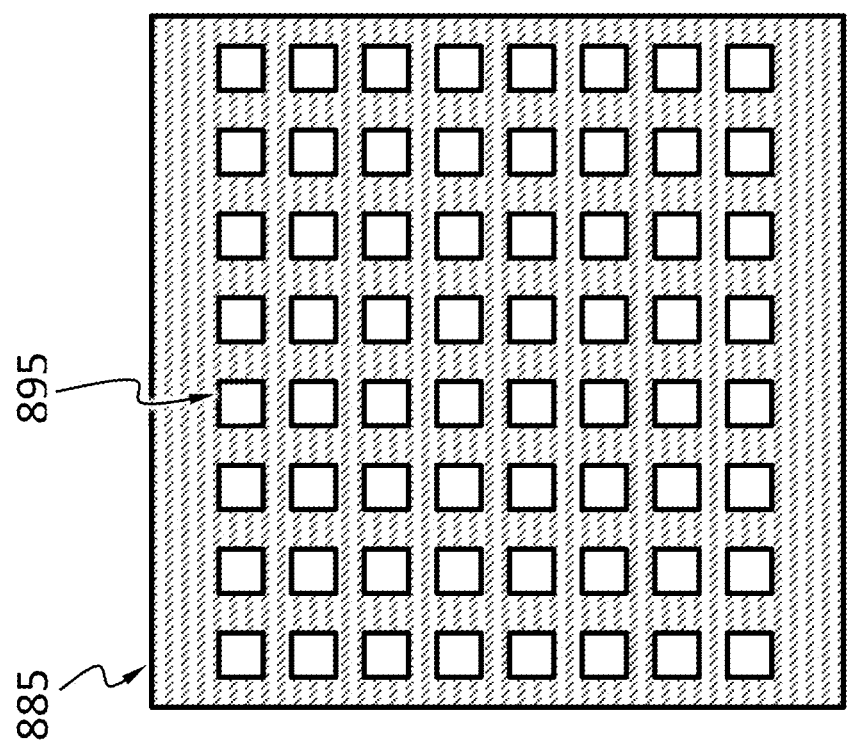

In an embodiment, schematically shown in FIG. 8C and FIG. 8D, the optical system 885 may have a plurality of collimators 895 arranged in an array. For example, the optical system 885 may have a dedicated collimator 895 for each pixel 870. For example, the optical system 885 may have a collimator 895 shared by a group of pixels 870. The collimator 895 may have any suitable cross-sectional shape, such as circular, rectangular, and polygonal.

In an embodiment, the collimators 895 may be made by etching (by e.g., deep reactive ion etching (deep RIE), laser drilling) holes into a substrate. The sidewall 897 may be made by depositing a material on the sidewall of the holes. The core 896 may be made by filling the holes. Planarization may also be used in the fabrication of the collimators 895.

Figure 8E:
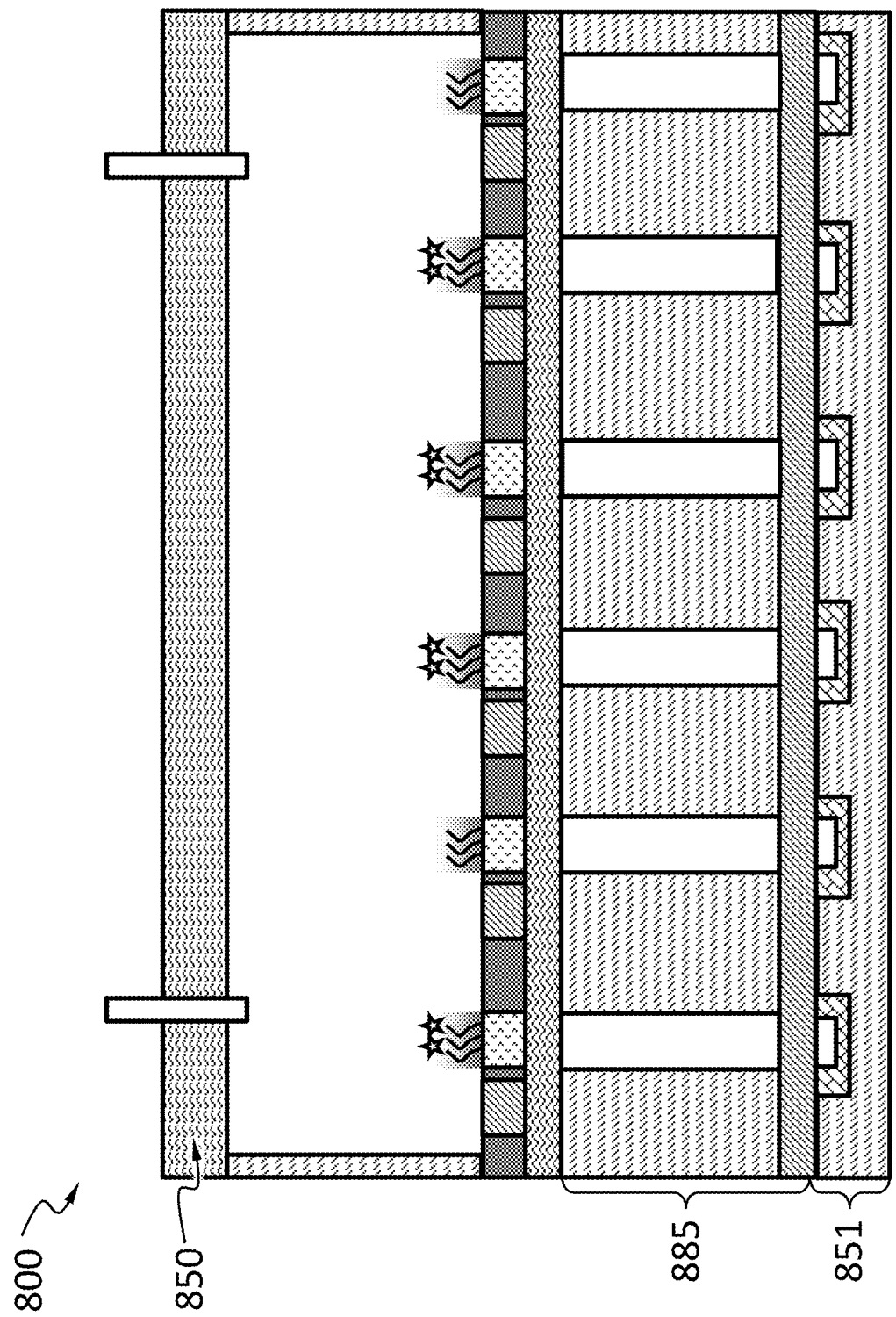
FIG. 8E schematically shows an apparatus in which the optical system may have a microfluidic system, according to an embodiment.

In an embodiment as schematically shown in FIG. 8E, in apparatus 800, the optical system 885 may have a microfluidic system 850 to deliver reactants such as the analyte and reaction product to and from probes. The microfluidic system 850 may have wells, reservoirs, channels, valves or other components. The microfluidic system 850 may also have heaters, coolers (e.g., Peltier devices), or temperature sensors. The heaters, coolers or temperature sensors may be located in the optical system 885, above or in the collimators 895. The heaters, coolers or temperature sensors may be located above or in the sensor 851. The apparatus 800 may be used for a variety of assays. For example, the apparatus 800 can be used to conduct real-time polymerase chain reaction (e.g., quantitative real-time PCR (qPCR)). Real-time polymerase chain reaction (real-time PCR) detects amplified DNA as the reaction progresses. This is in contrast to traditional PCR where the product of the reaction is detected at the end. One real-time PCR technique uses sequence-specific probes labeled with a fluorophore which fluoresces only after hybridization of the probe with its complementary sequence, which can be used to quantify messenger RNA (mRNA) and non-coding RNA in cells or tissues.

The optical system 885 and the sensor 851 may be fabricated in separate substrates and bonded together using a suitable technique, such as, flip-chip bonding, wafer-to-wafer direct bonding, or gluing.

Figure 9A:
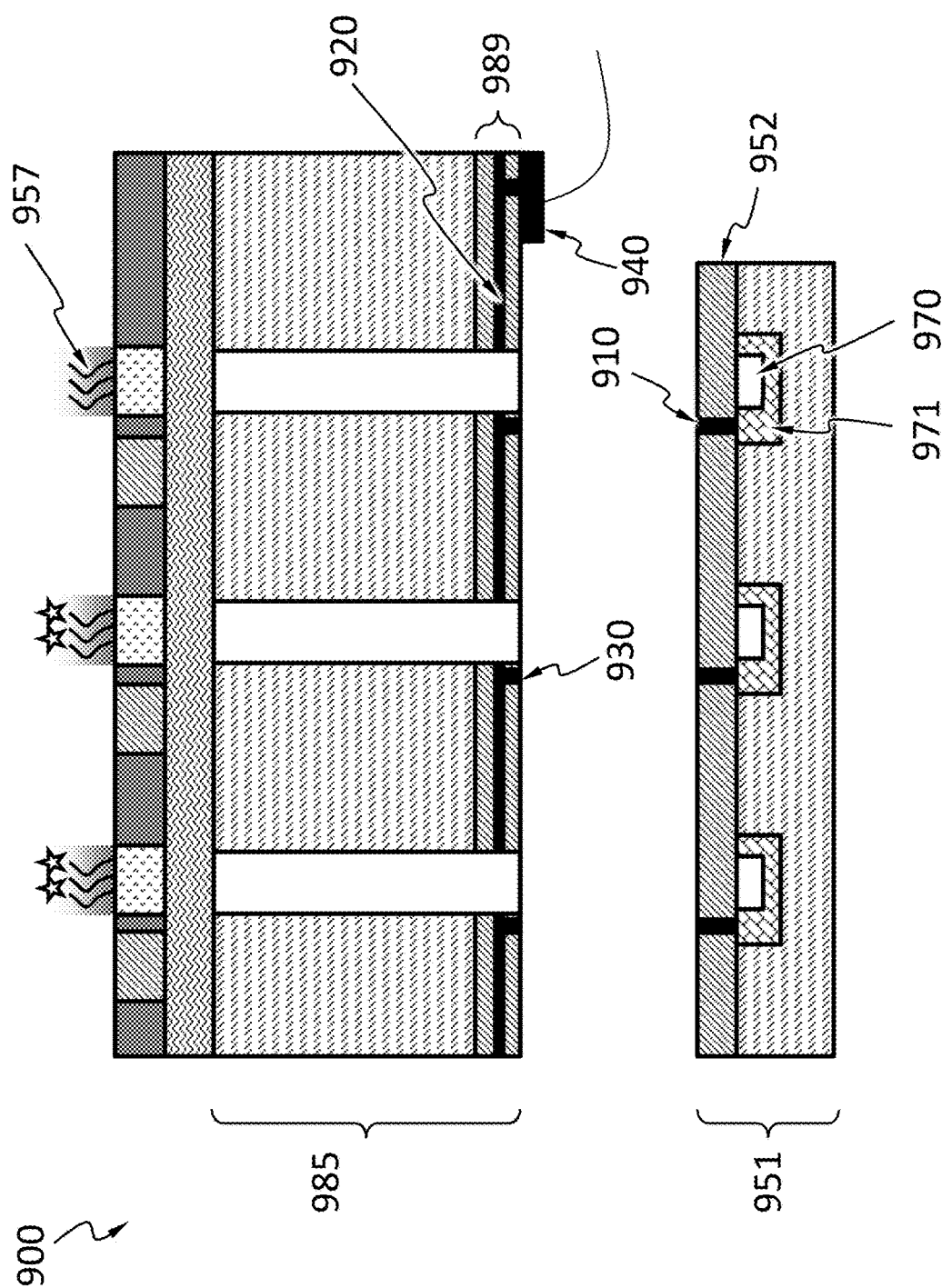
FIG. 9A schematically shows an apparatus wherein a sensor in a microarray may have a signal transfer layer and that the optical system in the microarray may have a redistribution layer, according to an embodiment.

In an embodiment, schematically shown in FIG. 9A, in apparatus 900, the sensor 951 has a signal transfer layer 952. The signal transfer layer 952 may have a plurality of vias 910. The signal transfer layer 952 may have electrically insulation materials (e.g., silicon oxide) around the vias 910. The optical system 985 may have a redistribution layer 989 with transmission lines 920 and vias 930. The transmission lines 920 connect the vias 930 to bonding pads 940. When the sensor 951 and the optical system 985 are bonded, the vias 910 and the vias 930 are electrically connected. This configuration shown in FIG. 9A allows the bonding pads 940 to be positioned away from the probes 957.

Figure 9C:
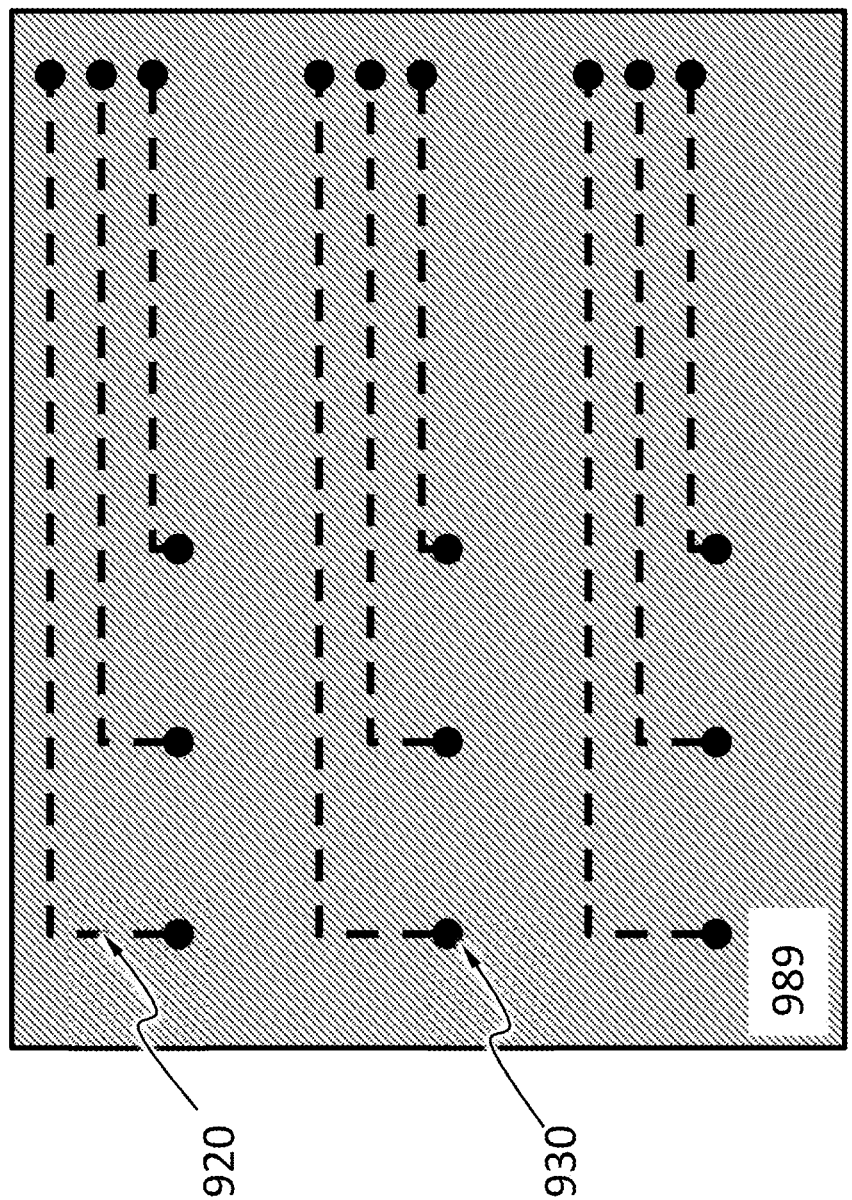
FIG. 9C schematically shows a bottom view of the optical system in FIG. 9A.

FIG. 9B shows a top view of the sensor 951 in FIG. 9A to illustrate the positions of the vias 910 relative to the pixels 970 and the control circuit 971. The pixels 970 and the control circuit 971 are shown in dotted lines because they are not directly visible in this view. FIG. 9C shows a bottom view of the optical system 985 in FIG. 9A to illustrate the positions of the vias 930 relative to the transmission lines 920 (shown as dotted lines because they are not directly visible in this view).

Figure 10A:
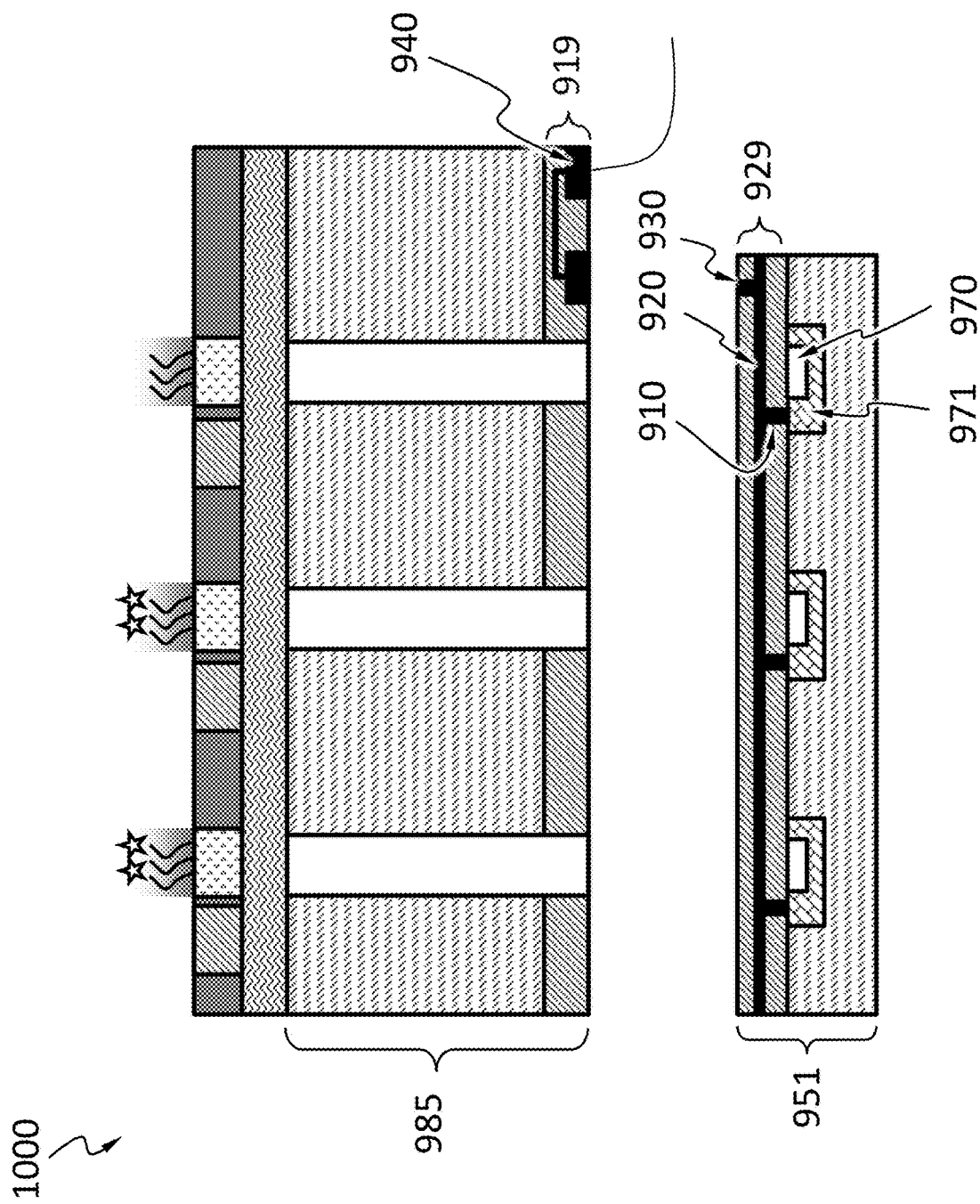
FIG. 10A schematically shows an apparatus wherein a sensor in a microarray may have a redistribution layer and that the optical system in the microarray may have a signal transfer layer, according to an embodiment.

In an embodiment, schematically shown in FIG. 10A, in apparatus 1000, the sensor 951 has a redistribution layer 929. The redistribution layer 929 may have a plurality of vias 910 and a plurality of transmission lines 920. The redistribution layer 929 may have electrically insulation materials (e.g., silicon oxide) around the vias 910 and the transmission lines 920. The vias 910 electrically connect the control circuit 971 to the transmission lines 920. The optical system 985 may have a layer 919 with bonding pads 940. The redistribution layer 929 may also have vias 930 electrically connecting the transmission lines 920 to the bonding pads 940, when the sensor 951 and the optical system 985 are bonded. The bonding pads 940 may have two parts connected by a wire buried in the layer 919. This configuration shown in FIG. 10A allows the bonding pads 940 to be positioned on an opposite side from the probe carrier.

Figure 10B:
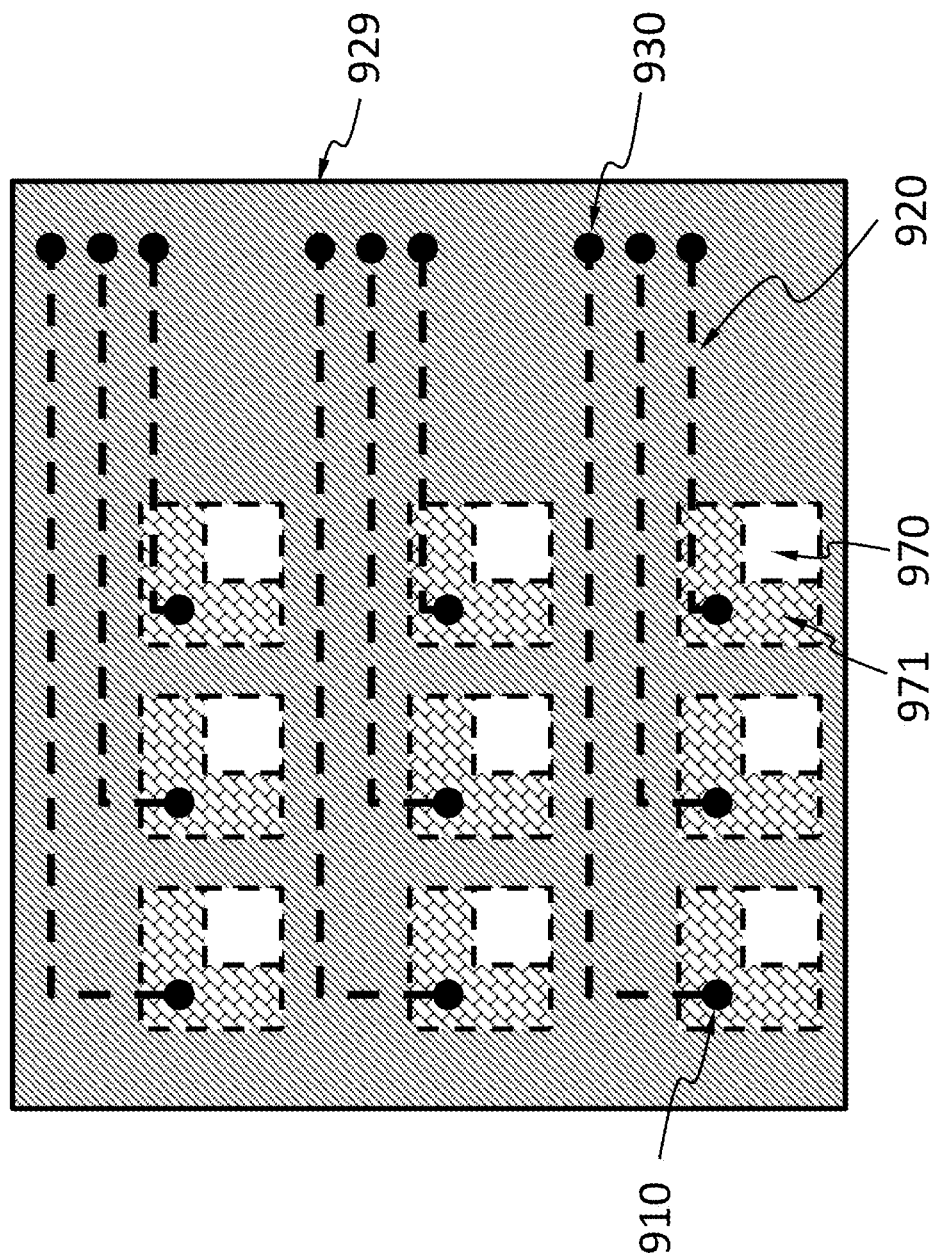
FIG. 10B schematically shows a top view of the sensor in FIG. 10A, according to an embodiment.
Figure 10C:
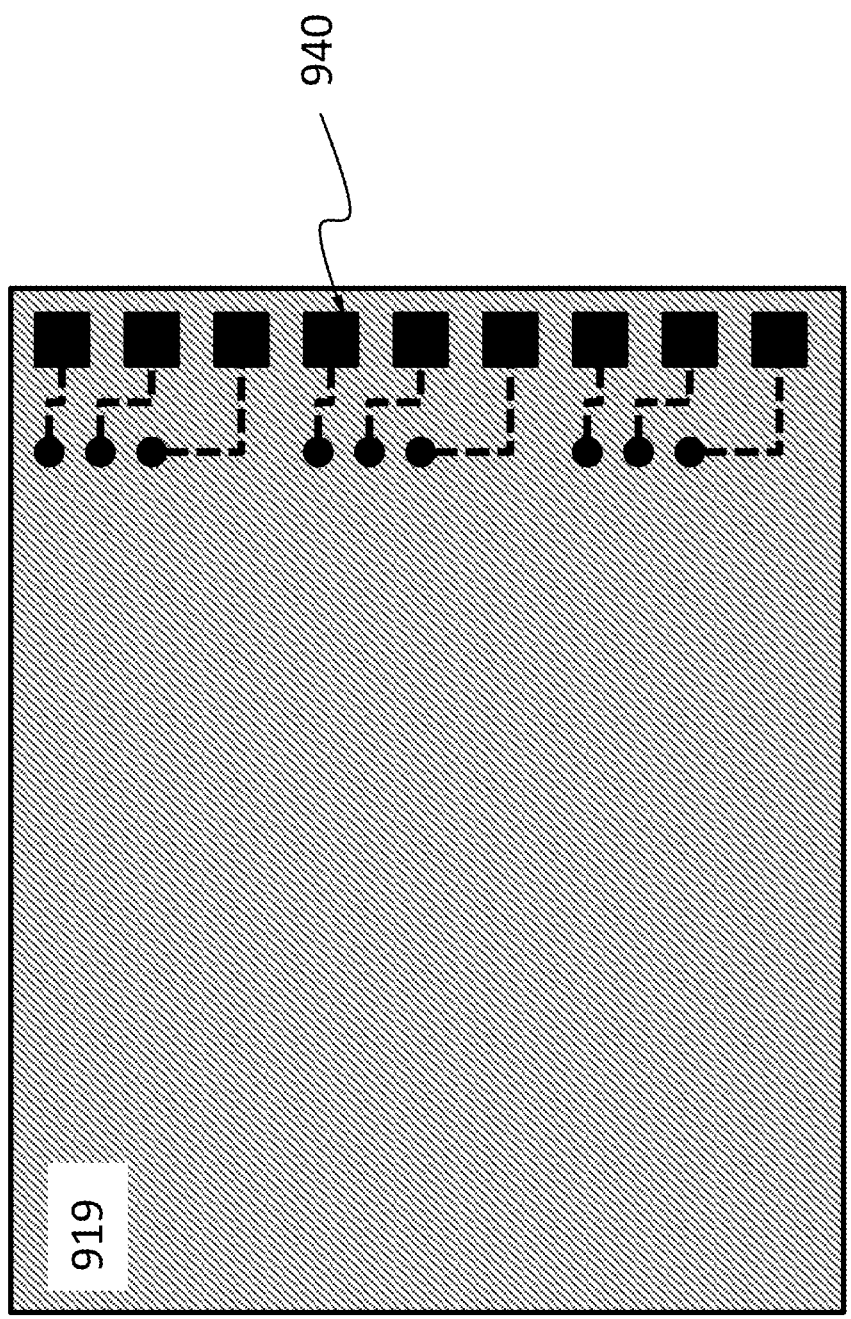
FIG. 10C schematically shows a bottom view of the optical system in FIG. 10A.

FIG. 10B shows a top view of the sensor 951 in FIG. 10A to illustrate the positions of the vias 910, the vias 930 and the transmission lines 920, relative to the pixels 970 and the control circuit 971, according to an embodiment. The pixels 970, the control circuit 971 and the transmission lines 920 are shown in dotted lines because they are not directly visible in this view. FIG. 10C shows a bottom view of the optical system 985 in FIG. 10A to illustrate the positions of the bonding pads 940, which are positioned to connect to the vias 930 shown in FIG. 10B. The bonding pads 940 may have two parts connected by a wire buried in the layer 919.

Figure 10D:
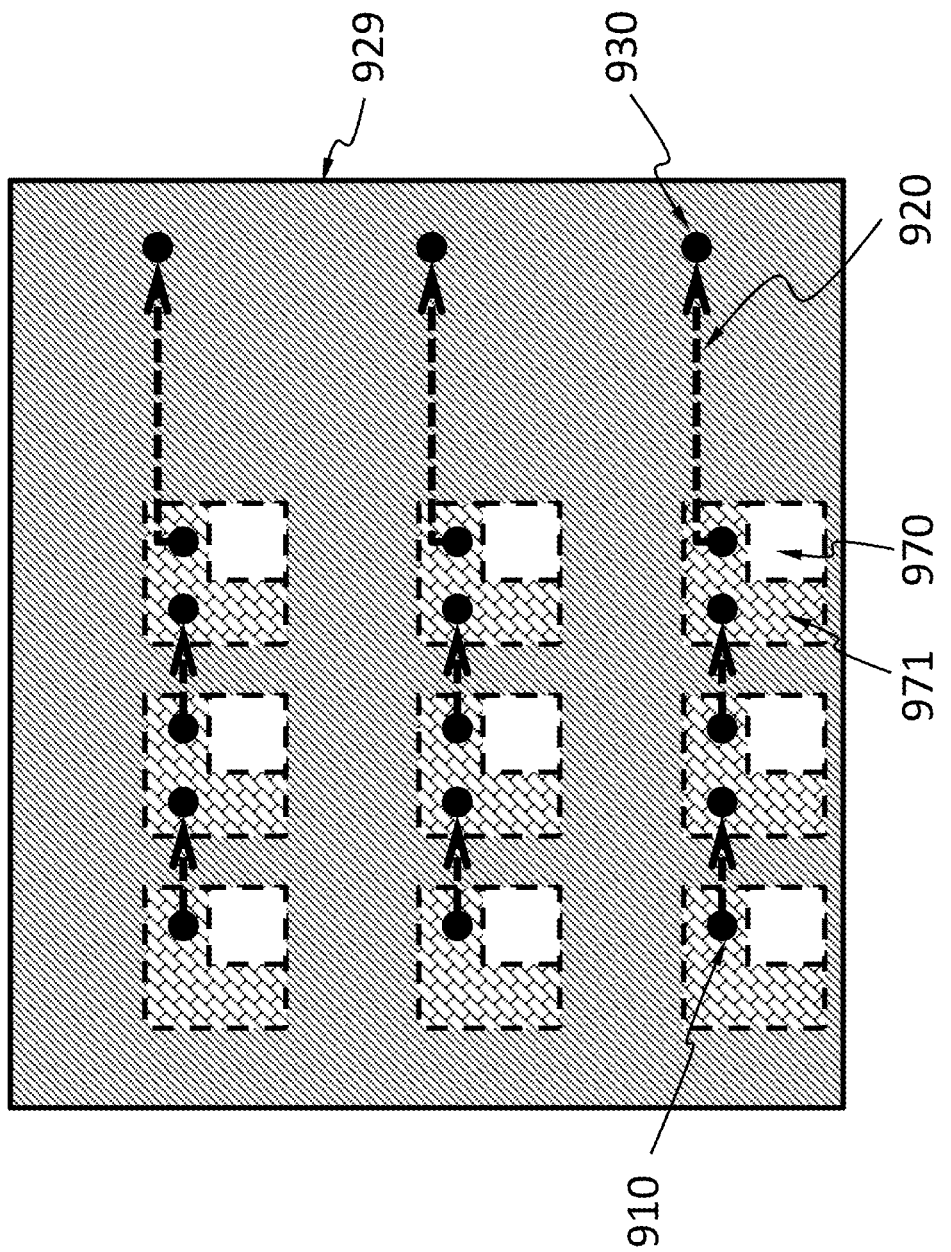
FIG. 10D schematically shows a top view of the sensor in FIG. 10A, according to an embodiment.
Figure 10E:
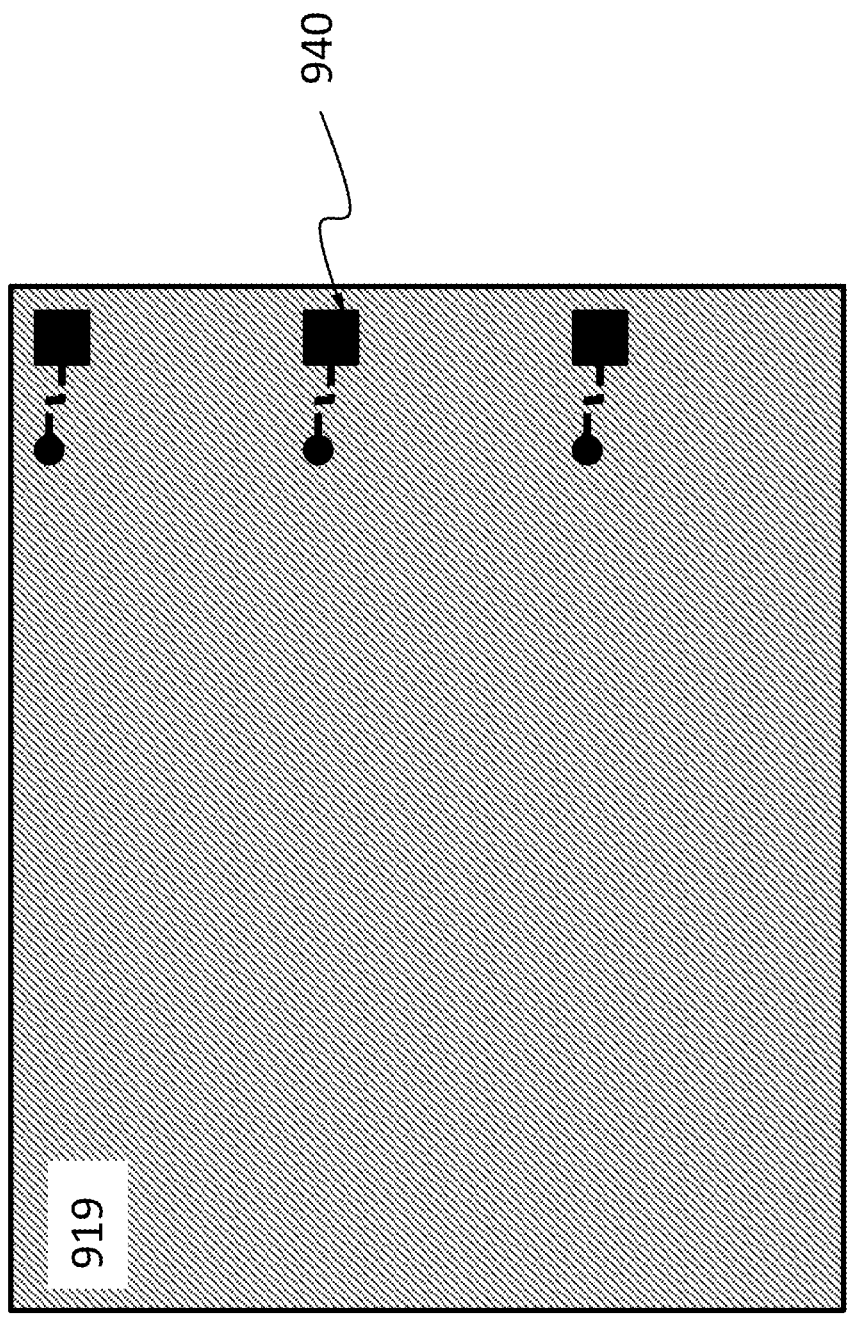
FIG. 10E schematically shows a bottom view of the optical system in FIG. 10A to illustrate the positions of the bonding pads, which are positioned to connect to the vias shown in FIG. 10D.

FIG. 10D shows a top view of the sensor 951 in FIG. 10A to illustrate the positions of the vias 910, the vias 930 and the transmission lines 920, relative to the pixels 970 and the control circuit 971, according to an embodiment. The pixels 970, the control circuit 971 and the transmission lines 920 are shown in dotted lines because they are not directly visible in this view. The pixels 970 may be read out column by column. For example, signal from one 970 may be stored in register in the control circuit 971 associated with that pixel 970; the signal may be successively shifted from one column to the next, and eventually to other processing circuitry through vias 930. FIG. 10E shows a bottom view of the optical system 985 in FIG. 10A to illustrate the positions of the bonding pads 940, which are positioned to connect to the vias 930 shown in FIG. 10D. The bonding pads 940 may have two parts connected by a wire buried in the layer 919.

Figure 10G:
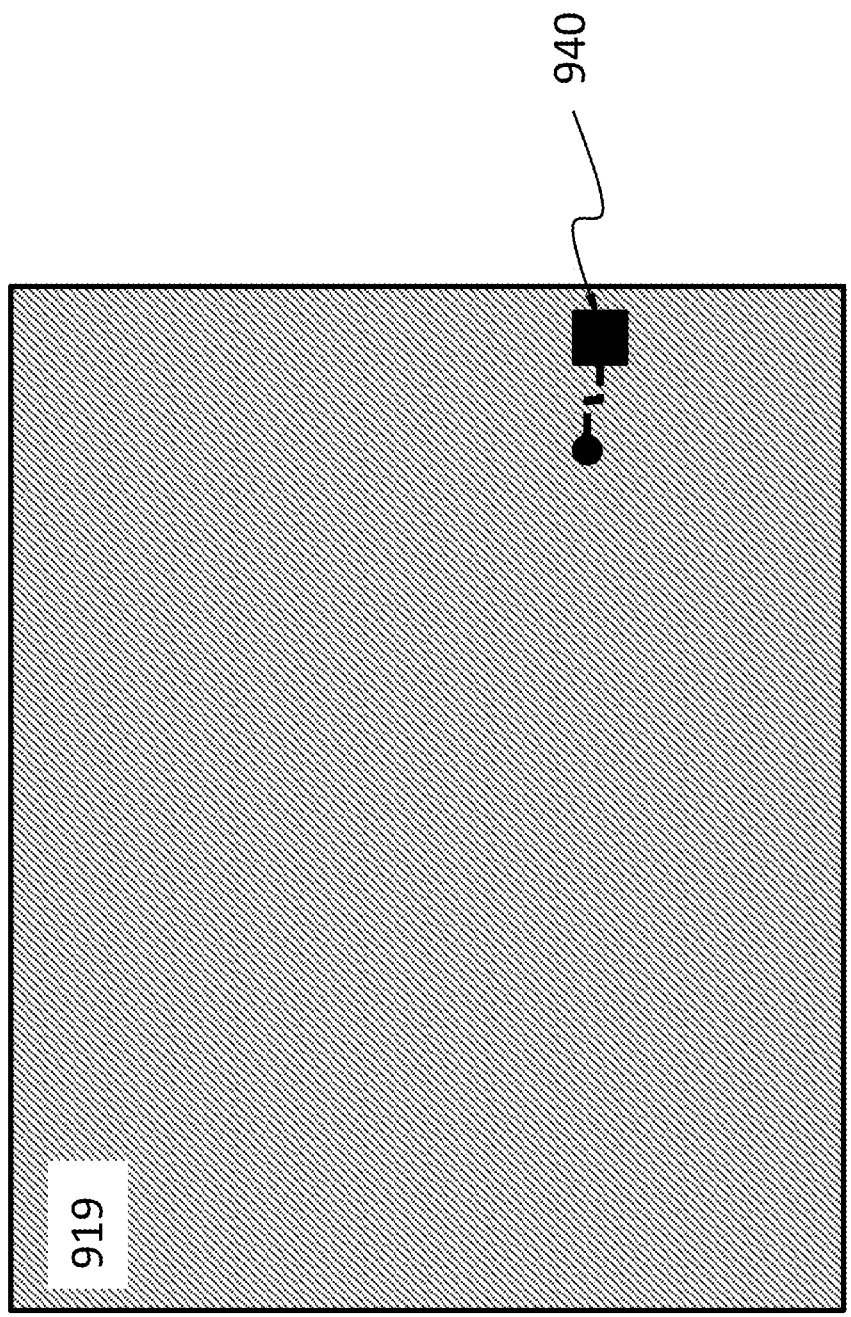
FIG. 10G schematically shows a bottom view of the optical system in FIG. 10A to illustrate the positions of the bonding pad, which are positioned to connect to the via shown in FIG. 10F.

FIG. 10F shows a top view of the sensor 951 in FIG. 10A to illustrate the positions of the vias 910, the via 930 and the transmission lines 920, relative to the pixels 970 and the control circuit 971, according to an embodiment. The pixels 970, the control circuit 971 and the transmission lines 920 are shown in dotted lines because they are not directly visible in this view. The pixels 970 may be read out pixel by pixel. For example, signal from one 970 may be stored in register in the control circuit 971 associated with that pixel 970; the signal may be successively shifted from one pixel to the next, and eventually to other processing circuitry through via 930. FIG. 10G shows a bottom view of the optical system 985 in FIG. 10A to illustrate the positions of the bonding pad 940, which are positioned to connect to the via 930 shown in FIG. 10F. The bonding pads 940 may have two parts connected by a wire buried in the layer 919.

Figure 11:
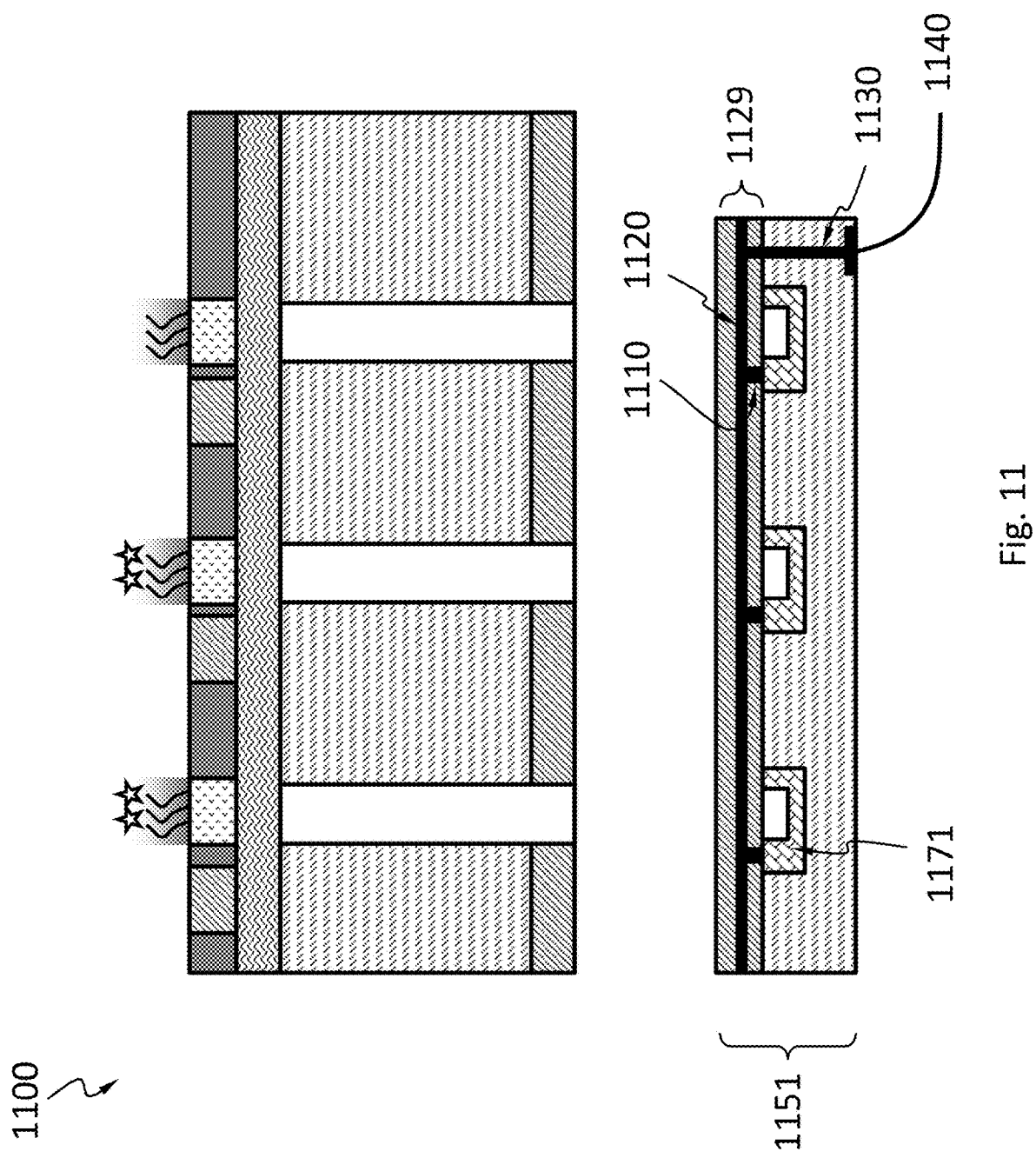
FIG. 11 schematically shows that system 1100 wherein a sensor in a microarray may have a redistribution layer with vias such as through-silicon vias (TSV) configured to electrically connect the transmission lines in the redistribution layer to bonding pads on the side opposite from the redistribution layer, according to an embodiment.

In an embodiment, schematically shown in FIG. 11, in system 1100, the sensor 1151 has a redistribution layer 1129. The redistribution layer 1129 may have a plurality of vias 1110 and a plurality of transmission lines 1120. The redistribution layer 1129 may have electrically insulation materials (e.g., silicon oxide) around the vias 1110 and the transmission lines 1120. The vias 1110 electrically connect the control circuit 1171 to the transmission lines 1120. The redistribution layer 1129 may also have vias 1130 (e.g., through-silicon vias (TSV)) electrically connecting the transmission lines 1120 to bonding pads 1140 on the side opposite from the redistribution layer 1129. This configuration shown in FIG. 11 allows the bonding pads 1140 to be positioned on an opposite side from the probe carrier.

Figure 12:
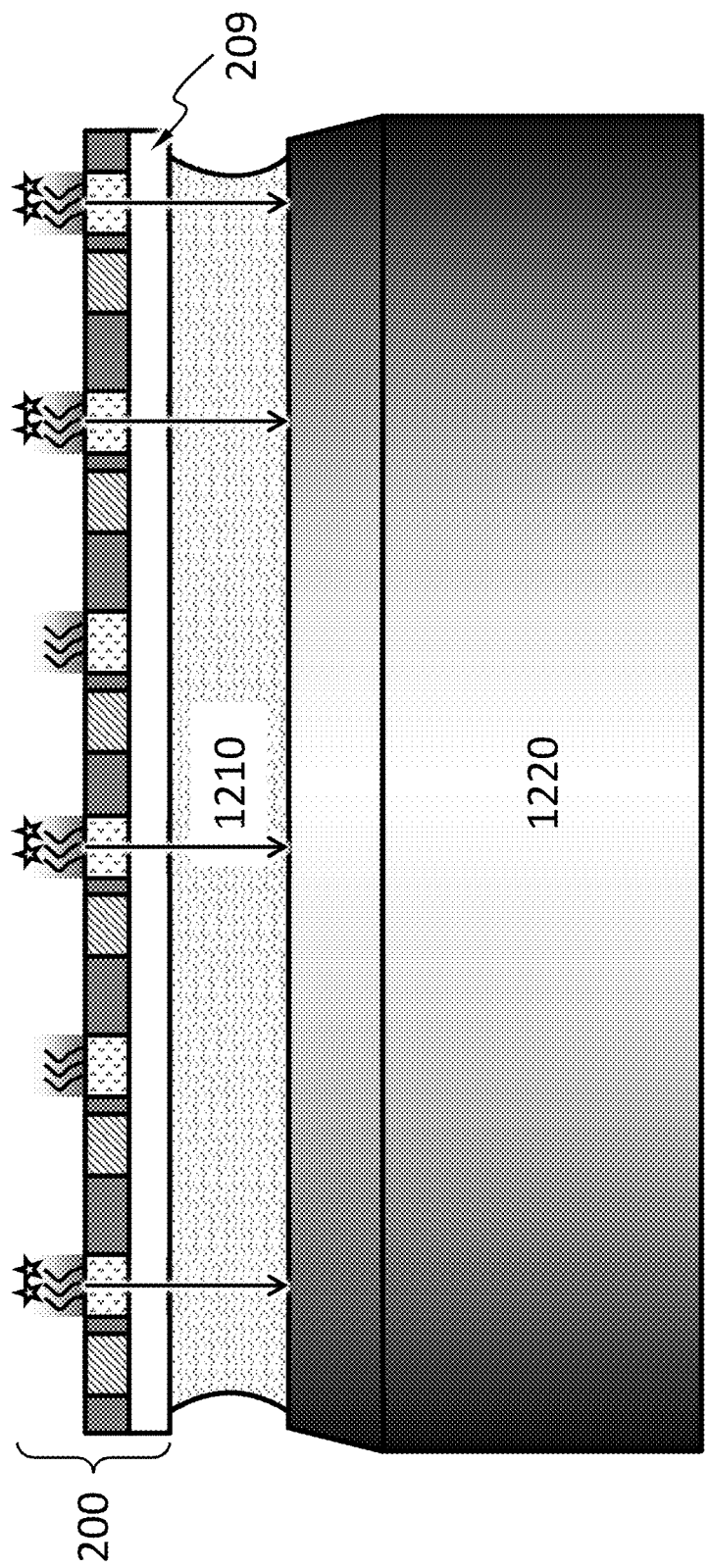
FIG. 12 schematically shows that system of total internal reflection fluorescence microscope (TIRFM).

The apparatus 200 may be integrated into a total internal reflection fluorescence microscope (TIRFM). The TIRFM has a lens 1220 that may be positioned on the side of the substrate 209 opposite to the probes, as shown in FIG. 12. The lens 1220 may be immersed in a drop of oil 1210 to increase the numerical aperture. Collimators such as 695 may be omitted because the optical system of the TIRFM may be configured to block light that is not parallel to the optical axis, for example, by an aperture at the pupil plane.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An apparatus comprising:
 an optical waveguide configured to receive light from an end surface of the optical waveguide;
 a first waveguide coupler optically coupled, at a first coupling strength, to a first portion of the optical waveguide;
 a second waveguide coupler optically coupled, at a second coupling strength, to a second portion of the optical waveguide;

wherein attenuation of the light at the first portion is smaller than attenuation of the light at the second portion;

wherein the first coupling strength is smaller than the second coupling strength;

wherein the first waveguide coupler and the second waveguide coupler each comprises a surface comprising sites configured to attach a probe.

2. The apparatus of claim 1, wherein a refractive index of the optical waveguide is greater than a refractive index of water.

3. The apparatus of claim 1, wherein refractive indices of the first waveguide coupler and the second waveguide coupler are greater than a refractive index of water.

4. The apparatus of claim 1, wherein cross-sectional shape of the optical waveguide is a rectangle, a square, a triangle, or a semi-circle.

5. The apparatus of claim 1, wherein cross-sectional shape of the first waveguide coupler and the second waveguide coupler is a rectangle, a square, a triangle, or a semi-circle.

6. The apparatus of claim 1, wherein the first waveguide coupler and the second waveguide coupler extend parallel to the first portion and the second portion, respectively.

7. The apparatus of claim 1, wherein space between the optical waveguide and the first waveguide coupler and the second waveguide coupler is filled with a material.

8. The apparatus of claim 1, wherein the optical waveguide, the first waveguide coupler and the second waveguide coupler each comprise a material selected from a group consisting of: glass, quartz, diamond, an organic polymer, and a composite thereof.

9. The apparatus of claim 1, wherein the sites are configured to directly attach to the probe through physical adsorption, chemical crosslinking, electrostatic adsorption, hydrophilic interaction or hydrophobic interaction.

10. The apparatus of claim 9, wherein the probe is selected from a group consisting of fluorescently proteins, peptides, oligonucleotides, cells, bacteria, and nucleic acids.

11. The apparatus of claim 10, wherein the probe comprises an internal luminophore.

12. The apparatus of claim 1, wherein the first waveguide coupler is farther from the optical waveguide than the second waveguide coupler is.

13. The apparatus of claim 1, wherein the first portion is shorter than the second portion.

14. The apparatus of claim 1, comprising a sensor and a plurality of collimators optically coupling the sensor to the sites of the first and second optical waveguide couplers; wherein the collimators are configured to essentially prevent light from passing if a deviation of a propagation direction of the light from an optical axis of the collimators is greater than a threshold.

15. The apparatus of claim 14, a wherein the sensor comprises a plurality of pixels configured to detect a signal generated by the apparatus.

16. The apparatus of claim 15, wherein the sensor comprises a control circuit configured to control, acquire data from, or process data from the pixels.

17. The apparatus of claim 15, wherein the pixels are arranged such that at least one of the pixels is optically coupled to each of the sites.

18. The apparatus of claim 15, wherein the pixels are optically coupled to the sites by the collimators.

19. The apparatus of claim 15, wherein the signal is luminescence.

20. The apparatus of claim 15, wherein the signal is generated under excitation of light coupled from the optical waveguide to the first waveguide coupler or the second waveguide coupler.

21. The apparatus of claim 14, further comprising a plurality of microlenses configured to focus light generated by the probe into the collimators.

22. The apparatus of claim 15, wherein the collimators are configured to eliminate optical cross-talk between neighboring pixels among the plurality of pixels.

23. The apparatus of claim 14, wherein at least one of the collimators comprises a core and a sidewall surrounding the core.

24. The apparatus of claim 23, wherein the core is a material that essentially prevents the light from passing through irrespective of propagation direction of the light.

25. The apparatus of claim 23, wherein the core allows a signal generated by the apparatus to pass through essentially unabsorbed.

26. The apparatus of claim 23, wherein the core is a void space.

27. The apparatus of claim 23, wherein the sidewall attenuates a portion of a signal generated by the apparatus reaching the sidewall.

28. The apparatus of claim 23, wherein the sidewall is textured.

29. The apparatus of claim 15, wherein the pixels are arranged in an array and are configured to be read out column by column.

30. The apparatus of claim 15, wherein the pixels are arranged in an array and are configured to be read out pixel by pixel.

31. The apparatus of claim 1, further comprising a lens configured to observe the probe.

* * * * *